(12) United States Patent
Van Wingerden et al.

(10) Patent No.: US 12,116,983 B2
(45) Date of Patent: Oct. 15, 2024

(54) ENHANCED WAKE MIXING FOR FLOATING WIND TURBINES

(71) Applicant: TECHNISCHE UNIVERSITEIT DELFT, Delft (NL)

(72) Inventors: Jan Willem Van Wingerden, Delft (NL); Daniel Graham Van Den Berg, Delft (NL)

(73) Assignee: TECHNISCHE UNIVERSITEIT DELFT, Delft (NL)

( * ) Notice: Subject to any disclaimer, the term of this patent is extended or adjusted under 35 U.S.C. 154(b) by 0 days.

(21) Appl. No.: 18/560,870

(22) PCT Filed: May 13, 2022

(86) PCT No.: PCT/NL2022/050263
§ 371 (c)(1),
(2) Date: Nov. 14, 2023

(87) PCT Pub. No.: WO2022/240292
PCT Pub. Date: Nov. 17, 2022

(65) Prior Publication Data
US 2024/0229770 A1    Jul. 11, 2024

(30) Foreign Application Priority Data

May 14, 2021  (NL) .................................. 2028217

(51) Int. Cl.
*F03D 7/02* (2006.01)
*F03D 7/04* (2006.01)
*F03D 13/25* (2016.01)

(52) U.S. Cl.
CPC ............ *F03D 7/048* (2013.01); *F03D 7/0224* (2013.01); *F03D 13/256* (2023.08); *F05B 2270/204* (2020.08); *F05B 2270/329* (2013.01)

(58) Field of Classification Search
CPC .. F03D 7/0224; F03D 7/0204; F05B 2240/93; F05B 2270/204
See application file for complete search history.

(56) References Cited

U.S. PATENT DOCUMENTS 9,732,730 B2    8/2017  Friedrich et al.
10,030,631 B2 *  7/2018  Couchman ................ F03D 9/25
(Continued)

FOREIGN PATENT DOCUMENTS

| EP | 3004636 A1 | 4/2016 |
| WO | 2014191001 A1 | 12/2014 |
| WO | 2021053252 A1 | 3/2021 |

OTHER PUBLICATIONS

International Search Report for PCT/NL2022/050263, mailed Aug. 1, 2022, 3 pages.
(Continued)

*Primary Examiner* — Justin D Seabe
(74) *Attorney, Agent, or Firm* — NIXON & VANDERHYE

(57) ABSTRACT

Wind turbine comprising a rotor, comprising at least a first blade, and a supporting structure for supporting said rotor up in the air; wherein said first blade is arranged to rotate in a rotor plane around a rotor axis of the rotor and wherein said first blade is rotatable by a blade pitch driving mechanism around a blade pitch axis that is substantially parallel to a longitudinal axis of the blade, wherein said rotor axis is movable in at least one of a rotational tilt direction, a rotational yaw direction and a fore-aft translational direction and wherein the wind turbine further comprises a controller for controlling the wind turbine by varying an induction factor of the first blade over time while the rotor rotates around its rotor axis, wherein the controller is further arranged for varying said induction factor of the first blade by controlling the blade pitch driving mechanism for apply- (Continued)

ing an oscillatory blade pitch rotation to the first blade, and by inducing an oscillatory motion of the rotor axis in the at least one of the rotational tilt direction, the rotational yaw direction and the fore-aft translational direction.

20 Claims, 14 Drawing Sheets

(56) References Cited

U.S. PATENT DOCUMENTS

| | | | | |
|---|---|---|---|---|
| 10,107,261 | B2* | 10/2018 | Zheng | F03D 7/042 |
| 10,184,450 | B2* | 1/2019 | Wilson | F03D 17/00 |
| 11,204,018 | B2* | 12/2021 | Nielsen | B63B 35/44 |
| 2022/0325695 | A1* | 10/2022 | Serna Garcia-Conde | F03D 7/0224 |
| 2022/0332392 | A1* | 10/2022 | Esbensen | B63B 21/50 |
| 2022/0412310 | A1* | 12/2022 | Van Wingerden | F03D 7/0204 |
| 2023/0108917 | A1* | 4/2023 | Esbensen | F03D 7/02 290/44 |

OTHER PUBLICATIONS

Written Opinion of the ISA for PCT/NL2022/050263, mailed Aug. 1, 2022, 5 pages.
Rockel Stanislav et al., "Experimental Study on Influence of Pitch Motion on the Wake of a Floating Wind Turbine Model", Energies, vol. 7, No. 4, Mar. 27, 2014, pp. 1954-1985.

* cited by examiner

ENHANCED WAKE MIXING FOR FLOATING WIND TURBINES

This application is the U.S. national phase of International Application No. PCT/NL2022/050263 filed May 13, 2022 which designated the U.S. and claims priority to NL 2028217 filed May 14, 2021, the entire contents of each of which are hereby incorporated by reference.

The present disclosure relates to a wind turbine, in particular a floating wind turbine, a wind turbine controller for said wind turbine and a method for controlling said wind turbine, in particular a method of reducing wake effects of a wake formed downstream of said wind turbine.

In order to meet the 1.5-degree Celsius climate-stabilizing goal set out by the Paris Agreement, a large reduction in fossil fuelled power production is required in the coming years. In order to replace this power production capacity, large increases in renewable energy sources, such as solar and wind energy, are required.

The most effective approach of developing wind energy on a large scale is by placing large amounts of individual wind turbines in so called wind farms. These wind farms comprise multiple wind turbines, typically of the same type, that are divided over a certain area and typically share a common infrastructure, thereby reducing the overall capital operational expenses of the turbines as well as allowing for efficiently maintaining the wind farm, while at the same time limiting the effective use of space.

However, when wind turbines extract energy from the wind, a wake is generated downstream of the turbine. In the wake of a wind turbine, the (average) wind speed is reduced and (average) turbulence is increased. This negatively affects turbines located further downstream, as the reduced wind speed leads to a lower energy production and the increased turbulence adds to the fatigue loads endured by the downstream turbine.

As the flow proceeds further downstream, there is a spreading of the wake and thereby a mixing with the surrounding free flow wind, such that the wake recovers towards free stream conditions over time (and thereby distance). Due to the fact that the arrangement of a wind farm is a trade-off between the area available, installed power and infrastructure costs, it is economically very unattractive to space the wind turbines at such mutual distances that the wake effects are minimized.

In order to optimize the power output on the wind farm level, as opposed to the individual wind turbine level, it has been proposed to apply steady-state optimal control, also known as so-called axial induction control or the derating approach, wherein a wind turbine arranged upstream in the wind farm is controlled to lower its power production (i.e. to derate its performance) such that a wind turbine arranged downwind can extract slightly more energy from the wind passing the turbine. It was however found that the potential power gain of such a static derating approach compared to the steady-state "greedy" strategy, where all turbines operate at their individual optimum, can even lead to lower overall power production.

In order to reduce the cost of transporting the generated energy, in particular wind generated electricity, it is desirable to generate the electricity close to inhabited areas and/or industrial areas where the electricity is to be used. However, as in many of these areas are located near seas and the availability of land is scarce, offshore wind farms that are situated in the sea, or large lakes, are essential in order to achieve the required installed capacity of renewable energy. As, especially in Europe, many of the available locations feature water depths of over 50 m deep, it may become economically attractive to install these turbines on floating foundations that float on the water, instead of on foundations installed into, and fixedly connected to, the seabed.

These floating foundations typically comprises a buoyant body that ensures the floating (i.e. floatable) wind turbine is kept afloat and, typically, one or more mooring lines that couple the buoyant body to one or more earth-fixed connection points for keeping the buoyant body, and thereby the floating wind turbine, in position. As these floating foundations are thereby not rigidly earth-fixed, i.e. rigidly fixed to the seabed, such floating foundations are, at least to some extent, typically able to move around in the different translation direction (i.e. surge, sway, heave) and rotate in the different rotational directions (i.e. pitch, yaw, roll). The amount of movement allowable is typically determined by the type of floating foundation and the arrangement of the associated mooring lines.

However, in case of supporting a wind turbine on a movable foundation, for instance a floating foundation, the movement of the foundation (and/or the flexibility in the support structure typically associated with a movable foundation), for instance caused by wave action and/or wind action on the foundation, may influence the rotation of the wind turbine while on the other hand the rotation of the wind turbine might have an influence on the movement of the foundation. The movability of the foundation may cause non-optimal operational circumstances for the wind turbine. For instance, an uncontrollable or at least ill-controlled amplification of the pitching motion may occur, especially in case the wind turbine is controlled using typical pitch control strategies originally developed for the control of rigidly supported, earth-fixed wind turbines. Pitching motion is also known as tilting motion (i.e. the swinging motion parallel to the rotor axis of the horizontal-axis wind turbine), such that an inherently instable wind turbine system is obtained. Furthermore, these pitch control strategies may result in suboptimal generation of energy by the wind turbine and may reduce its efficiency. Consequently, control strategies for rigidly earth-fixed turbines are typically not directly suitable for floating turbines.

Furthermore, as the floating foundations with wind turbines connected thereto may be excited by, for instance, the waves acting on the buoyant body, control strategies for floating turbines nowadays are typically focused on reducing (i.e. dampening) the motions of the buoyant body, and thereby of the entire wind turbine. For instance, in U.S. Pat. No. 9,732,730 B2 a control method for reducing the tilting moment of a floating turbine is described.

The present disclosure sets out to provide a wind turbine and a method of operating a wind turbine wherein at least one of the above described disadvantages has been at least partially alleviated. It may further be a goal to provide a wind turbine, especially a wind turbine arranged or to be arranged on a movable foundation structure such as a floatable (herein also referred to as "floating") foundation structure, or a method for operating the same, that enable an improved energy generation efficiency. It is a further goal to provide a wind turbine that allows reducing wake effects of a wake formed downstream of the wind turbine, such that a more densely populated wind farm can be obtained having an overall higher power output. Furthermore, Method of reducing wake effects of a wake formed downstream of a wind turbine according to any of the preceding claims In a first aspect, the disclosure relates to a wind turbine, in particular a floating wind turbine, comprising at least a first blade, and a supporting structure for supporting said rotor up in the air;
- wherein said first blade is arranged to rotate in a rotor plane along an azimuth rotational direction around a rotor axis of the rotor and wherein said first blade is rotatable by a blade pitch driving mechanism around a blade pitch axis that is substantially parallel to a longitudinal axis of the first blade;
- wherein said rotor axis is movable in at least one of a rotational tilt direction and a fore-aft translational direction;
- wherein the wind turbine further comprises a controller for controlling the wind turbine, wherein the controller is arranged for varying an induction factor of the first blade over time while the rotor rotates around its rotor axis, wherein the controller is arranged for varying said induction factor of the first blade by:
  - controlling the blade pitch driving mechanism to apply an oscillatory blade pitch rotation to at least the first blade;
  - inducing an oscillatory motion of the rotor axis in the at least one of the rotational tilt direction and the fore-aft translational direction.

According to embodiments of the present disclosure the rotor is arranged to extend essentially perpendicular to an imaginary longitudinal axis with respect to a foundation structure and/or wherein the wind turbine is a horizontal-axis wind turbine (HAWT).

According to embodiments of the present disclosure the rotor axis is movable in at least one of a rotational tilt direction, a rotational yaw direction and a fore-aft translational direction, wherein said rotational tilt direction is a rotational direction around a tilt axis that is substantially horizontal and substantially parallel to the rotor plane, said rotational yaw direction is a rotational direction around a yaw axis that is substantially vertical and substantially perpendicular to the tilt axis and said fore-aft translational direction is a direction substantially parallel to the rotor axis, and wherein the controller is configured to vary the induction factor of the at least first blade by controlling the blade pitch driving mechanism to apply an oscillatory blade pitch rotation to at least the first blade, thereby inducing an oscillatory motion of the rotor axis in the at least one of the rotational tilt direction and the fore-aft translational direction.

According to embodiments of the present disclosure the rotor is arranged to extend essentially parallel to an imaginary longitudinal axis with respect to a foundation structure and/or the wind turbine is a vertical-axis wind turbine (VAWT).

According to embodiments of the present disclosure the rotor axis is movable in at least one of a rotational tilt direction and a fore-aft translational direction, wherein said fore-aft translational direction is a direction substantially parallel to wind direction and wherein the rotational tilt direction is a rotational direction around a tilt axis that is substantially horizontal and substantially perpendicular to the fore-aft translational direction.

According to embodiments of the present disclosure the support structure is a movable, for instance floating, support structure. Use is made of the fact that rotation of the blades influences the movement of the support structure and movement of the support structure influences the rotation of the blades. Furthermore, the one or more blades of the wind turbine may be dynamically pitched, which will give a dynamic response to the rotor axis. The support structure may naturally amplify the dynamic induction effect and thus may more wake mixing may be created.

The wind turbine comprises a rotor comprising at least one blade, although typically the turbine comprises multiple blades, for instance two or three blades. The blades are configured to convert kinetic energy of the wind into mechanical energy. The mechanical energy may be converted by an electric generator into electrical energy. The blades are arranged to be rotated around their longitudinal axis, which is known as the blade pitch rotation. A modern turbine is typically (at least partially) controlled by varying the blade pitch angle and thereby altering the angle of attack of the blade. A blade pitch driving mechanism, comprising, for instance, an electric motor and/or hydraulic piston for driving the blade pitch rotation, is typically provided. The rotor is arranged to rotate around the rotor axis, which is, for a horizontal-axis wind turbine, typically oriented to be substantially horizontal and, when in use, substantially parallel to the incoming wind direction. Specifically, the velocity of the wind causes the blades to rotate which in turn power the electric generator. The rotating blades (effectively forming a rotor disc), however, slow down the wind and cause a wake to form behind the turbine. The wind within the wake has a slower average velocity, and a higher average turbulence, than the wind that passed around the rotor disc that did not pass through the turbine's blades. Moreover, the slower velocity of the wind in the wake relative to the velocity of the wind unaffected by the rotor causes a wake expansion, i.e. the diameter of the wake to expand beyond the diameter of the rotor. Generally, the wake defines a volume of fluid (e.g., air) that is affected by the blades of a turbine. Any turbine that is arranged downstream (i.e. downwind) within this wake can only use the relatively slower wind velocity to turn its blades, thereby leading to a lower power output of the downwind turbine. In addition, due to the increased average turbulence, the downwind turbine will also experience more fatigue loading, thereby negatively affecting its lifetime.

By transferring kinetic energy from the wind surrounding the wake into the wake itself, the relative velocity and turbulence differences of the wind in the wake and the surrounding air slowly decreases over time. This process is called turbulent mixing and reduces the wake effects of the wake formed downstream of a wind turbine as it moves away from the turbine. Because turbulent mixing happens naturally, the kinetic energy transferred from the wind to the wind turbine will eventually be replaced. However, the distance required to transfer the kinetic energy into the wake depends on the wind speed and/or on other atmospheric conditions. Therefore, a distance between a first and second turbine positioned close together (typically less than 10 rotor diameters, i.e. 10 D) may not be enough to return the kinetic energy taken by the first turbine before the wind reaches the second turbine arranged downstream of the first wind turbine.

Generally, the induction factor is determined by dividing the difference of the velocity of the wind upstream of a rotor plane $V_\infty$ and the velocity of the wind at the rotor plane (i.e. rotor disc) $V_d$ by the velocity of the wind upstream $V_\infty$, such that:

$$a = \frac{V_\infty - V_d}{V_\infty}$$

Moreover, each blade may have an individual induction factor associated with it. The induction factor of a blade may be changed by pitching the blade with respect to the wind, i.e. rotating the blade around its longitudinal axis such that an angle between the cross section of the blade and the rotor plane changes.

By controlling the blade pitch driving mechanism for applying an oscillatory blade pitch rotation to the first blade, an oscillatory change of the induction factor of the first blade is obtained over time while the rotor rotates around its rotor axis. Hereby, the speed and/or direction of the wind exiting the rotor plane are locally varied. This may at the same time increase the turbulent mixing within the wake, such that the wake effects in the wake formed downstream of a wind turbine are reduced.

The controller is also arranged to induce an oscillatory motion of the rotor axis in the at least one of the rotational tilt direction, the rotational yaw direction and the fore-aft translational direction, such that the blade also experiences an oscillatory rotational movement in the at least one of the rotational tilt direction, the rotational yaw direction and the fore-aft translational direction while rotating around the rotor axis. This causes the blade oscillate in at least a direction parallel to the wind direction, such that the relative velocity between the wind and the blade is locally changed, thereby effectively also varying the induction factor of the blade.

Hence, the oscillatory motion of the rotor axis thereby also aids in locally varying the speed (and direction) of the wind exiting the rotor plane, such that it leads to a further increase in the turbulent mixing within the wake, such that the wake effects in the wake formed downstream of a wind turbine are reduced even further. Hence, both the oscillatory blade pitching action and the oscillatory motion of the rotor axis lead to a local variation of the induction factor overtime and an increase in turbulent mixing, such that a synergetic effect of these two features, which are controlled by the controller, is obtained.

In a preferred embodiment, the controller is arranged for inducing said oscillatory motion of the rotor axis in the at least one of the rotational tilt direction, the rotational yaw direction and the fore-aft translational direction by controlling the blade pitch driving mechanism for applying the oscillatory blade pitch rotation of the of the first blade while the rotor rotates around its rotor axis. The oscillating blade pitching action of the at least first blade causes an oscillating variation in an amplitude and/or orientation of (i.e. direction of) the thrust force and/or an oscillating variation of a tilt and/or yaw moment of the rotor axis. As the rotor axis is movable, these oscillating variations of the respective force and/or moments cause the rotor axis to move, such that the oscillatory motion of the rotor axis in the at least one of the rotational tilt direction, the rotational yaw direction and the fore-aft translational direction is induced. The moveable rotor axis thus makes it possible to amplify the effect of the oscillating blade pitching action by inducing the respective motion(s). This may result in an increase of wake mixing with respect to the wake mixing that would be obtained from applying oscillating blade pitching action in case of a rotor axis that is not movable in the at least one of the rotational tilt direction, the rotational yaw direction and the fore-aft translational direction. Alternatively or additionally, this may result in a controlled redirection of the induced wake. In case the controllability of the direction of the induced wake is used to suitably redirect the wakes of a plurality of wind turbines (for instance, in a wind farm), an increase of the power output of the (combination of) wind turbines may be realized.

Preferably, the controller is arranged for varying the induction factor of the first blade (the induction factor being varied by varying the pitch angle of the first blade) over time such that the induction factor of the first blade varies with the rotation of the first blade along the azimuth rotational direction. In other words, the pitch angle is changed (or the induction factor of the first blade is changed) during the rotation of the first blade around the rotor axis. By varying the induction factor of the first blade with the rotation of the first blade along the azimuth rotational direction, the variation of the thrust force and/or respective movements, as is described above, can be obtained.

As mentioned above the wind turbine may have a support structure comprising a movable foundation structure. The movable foundation structure may be a floatable foundation structure, but other types of movable foundation structures may also be employed. For instance, a support structure comprising a spring assembly for protecting the wind turbine in case of an earthquake, a foundation arranged in weak ground, etc. In further embodiments, the supporting structure comprises a tower and a movable foundation structure. In certain circumstances even a flexible tower and foundation structure may be employed as well: the movability here is derived for at least a large part from the flexibility of the tower of the wind turbine itself.

In a still further embodiment wherein the tower of the supporting structure extends axially along a longitudinal axis of the wind turbine, the rotor is arranged at an upper section the tower and the movable foundation structure is arranged at a lower section of the tower. The movable foundation structure is movable in the at least one of the rotational tilt direction, the rotational yaw direction and the fore-aft translational direction and wherein said rotor axis is fixedly coupled to the tower, such that the movement of the movable foundation structure in the at least one of the rotational tilt direction, the rotational yaw direction and the fore-aft translational direction causes a movement of the rotor axis in the respective at least one of the rotational tilt direction, the rotational yaw direction and the fore-aft translational direction.

The movable foundation structure allows the rotor axis to move in the at least one of the rotational tilt direction, the rotational yaw direction and the fore-aft translational direction, such that the synergetic wake mixing effect, as is described can be obtained.

Preferably, said wind turbine is a floating wind turbine, wherein said supporting structure comprises a movable floating foundation structure having a buoyant body and, preferably, at least one mooring line for coupling the buoyant body to an earth-fixed connection point. As floating foundations are not rigidly earth-fixed, i.e. rigidly fixed to the seabed, such floating foundations are, at least to some extend, typically able to move around in the different translation direction (i.e. surge, sway, heave) and rotate in the different rotational directions (i.e. pitch, yaw, roll), such that the rotor axis is enabled to move in the at least one of the rotational tilt direction, the rotational yaw direction and the fore-aft translational direction.

Different types of floating foundations are, for instance, the spar buoy foundation, which is a cylinder with low water plane area, ballasted to keep the centre of gravity below the centre of buoyancy. The foundation can be kept in position by catenary or taut spread mooring lines with drag or suction anchors. A second type is, for instance, a semi-submersible that has a number of large columns linked by connecting bracings and/or submerged pontoons. The columns provide hydrostatic stability, and pontoons provide additional buoyancy. The foundation can be kept in position by catenary or taut spread mooring lines and drag anchors. A third type is the tension leg platform that is highly buoyant, with, for instance, a central column and arms connected to tensioned tendons which secure the foundation to the suction and/or piled anchors.

It is preferred that the controller is arranged for applying the oscillatory blade pitch rotation such that the blade pitch rotation varies between a minimum and maximum value around a mean blade pitch rotation. Hereby, the oscillatory blade pitch rotations can be applied around (i.e. superimposed onto) the normal blade pitch rotations that is applied as part of the normal pitch-controlled operation of a wind turbine, or of a floating wind turbine. This makes it possible to employ the methodology for increasing wake mixing also in existing (floating) wind turbines, by upgrading the existing controller to the controller according to the disclosure.

Preferably, the controller is arranged for applying the oscillatory blade pitch rotation of the first blade at a predetermined frequency, and for inducing the oscillatory motion of the rotor axis oscillate with substantially the same frequency. When both the oscillatory blade pitching and the oscillatory motion of the rotor axis oscillate at substantially the same frequency, a single frequency can be selected that improves the wake mixing effect, as is further described below. More generally, oscillatory blade pitching induces a force on the flow and causes an oscillatory motion of the rotor axis (because of the movability of the support structure) that will further enhance the induction by the blades and/or will steer the wake.

In specific embodiments of the present disclosure a phase difference between the oscillatory blade pitch rotation and the oscillatory motion of the rotor axis is exactly 180 degrees. However, in other embodiments also part of the present disclosure this phase difference is not exactly equal to 180 degrees. For instance, the phase difference may be substantially less than 180 degrees or substantially greater than 180 degrees, or less than 160 degrees or greater than 200 degrees, or even less than 135 degrees or greater than 225 degrees, optionally also less than 90 degrees or greater than 270 degrees. A phase difference of 180 degrees may sometimes lead to a reduction of the synergetic effect, as a reduced cooperation between the induction variation of the blade pitching and the motor of the rotor axis is obtained. Hence, a phase difference that is substantially less than 180 degrees or substantially greater than 180 degrees may lead to a greater synergetic effect, i.e. a greater amount of cooperation between the induction variation of the blade pitching and the motor of the roto axis, for obtaining a greater effect on the wake mixing.

In a preferred embodiment, the controller is arranged for (controlling the blade pitch driving mechanism for) applying the oscillatory blade pitch rotation to be a substantially sinusoidal oscillatory blade pitch rotation, preferably having a predetermined amplitude. Due to the size and weights of the individual blades of, especially, utility scale wind turbines, a smooth pitch signal, such as a sinusoidal signal, is preferred, as thereby no sudden, impact-like, excitations are introduced through the blade pitch driving mechanism, as these would excite all kinds of unwanted dynamics of the wind turbine structure and introduce an increased loading on the turbine and its components, among which is the blade pitch driving mechanism. The amount of increase wake mixing can be controlled in case the controller is arranged to control the oscillatory blade pitch rotation to have a predefined amplitude, as this allows to control the amount (i.e. amplitude) with which the induction factor of (at least) the first blade is varied.

Preferably, the rotor comprises at least a second blade that is rotatable by the blade pitch driving mechanism along around a blade pitch axis that is substantially parallel to a longitudinal axis of the blade. Varying the pitch angle (i.e. the oscillatory blade pitch rotation of the first blade) of the first blade might lead to some unbalance in the rotor. By also providing second blade that is rotatable around its pitch axis, as described here, the unbalance can, at least partly, be compensated for.

It is preferred that the controller is arranged for inducing at least one of the oscillatory rotational tilt motion and fore-aft translation motion of the rotor axis by controlling the blade pitch driving mechanism to apply a collective oscillatory blade pitch rotation to the first and second blade while the rotor rotates around its rotor axis. A collective oscillatory blade pitch rotation is a joint blade pitch rotation wherein the blades are given the same blade pitch rotation, such that a synchronous blade pitch rotation of the first and second are obtained. By applying the oscillatory collective blade pitch rotation, the blades all reach their maximum and minimum induction factor at the same time, such that the induction factor of the rotor also varies between a minimum and maximum (around a mean) with the same rate and also that thrust force acting on the turbine also oscillatory varies at the same rate. This can induce at least one of the oscillatory rotational tilt motion and fore-aft translation motion of the rotor axis, such that this also affects the induction factor of the entire rotor. Hence, the summation on the variation of the induction factor due to these two effects thereby leads to increased wake mixing in the wake downstream of the turbine.

In a preferred embodiment, the blade pitch driving mechanism is an individual blade pitch driving mechanism for independently driving the pitch rotations of the respective first and second blade, and wherein the controller is arranged for inducing the at least one of the rotational tilt direction, the rotational yaw direction and the fore-aft translational direction of the rotor axis by controlling the individual blade pitch driving mechanism for applying individual oscillatory blade pitch rotations to the first and second blade while the rotor rotates around its rotor axis, wherein the pitch rotation of the first blade differs from the pitch rotation of the second blade by a predetermined phase offset. The individual pitch driving mechanism allows for each blade to be pitched independently from the others. For this, each blade can, for instance, fitted with its own blade pitch driving mechanism, comprising for instance an electric motor and/or hydraulic cylinder, for driving the blade pitch rotation of the respective blade. The controller is then arranged to individually control each of the respective blade pitch driving mechanisms.

By individually controlling the first and second blade, this allows, for instance, to oscillate the respective blade pitch rotations of the respective blades in an out-of-phase manner. Thereby, the first blade can for instance be pitched such that a maximum blade induction factor is obtained, whereas the second blade can for instance be pitched such that a minimum blade induction factor is obtained simultaneously. Hereby, the total induction factor of the rotor can be kept substantially constant, such that the effect on the power production is reduced, while at the same time increasing the wake mixing in the wake formed downstream. Secondly, as (for instance) an induction factor is at minimum on one side of the rotor plane and at a maximum at another side of the rotor plane, the amplitude of the thrust force is not so much affect, but the effective location of the thrust force in the rotor plane is varied. The effective location of the thrust force is thereby not at the center of the rotor plane (i.e. at the rotor axis), but can be at a nonzero distance (as seen in the rotor plane) from the center. This force thereby generates a moment, or torque, around the center of the rotor plane. This torque will thereby, due to the movability of the rotor axis, cause a rotational movement of the rotor axis in at least one of the rotational tilt direction and the rotational yaw direction. Hereby, the movement of the rotor axis, as is described above, can be induced, such that the above described synergetic effect for increasing wake mixing, reducing wake effects downstream of the rotor and/or wake redirecting (i.e. steering of the wake direction) can be obtained. It is noted that the oscillatory pitch rotation of a respective blade can also be a combination (i.e. superposition) of a collective pitch rotation and an individual pitch rotation.

Preferably, the phase offset is determined by the angle of intersection, as seen along the azimuth rotational direction, between the first and second blade in the rotor plane; and/or wherein the individual oscillatory blade pitch rotations of the first and second blade oscillate with substantially the same frequency and the same amplitude of rotation. The phase offset is thus preferably equal to the angle of intersection, such that the total induction factor of the rotor can be kept substantially constant, thereby reducing the effect on the power production, while at the same time increasing the wake mixing in the wake formed downstream, as is described above. For this is it furthermore beneficial that the blade pitch rotations of the first and second blade oscillate with substantially the same frequency and the same amplitude of rotation.

In a preferred embodiment, the controller is arranged for determining the oscillatory blade pitch rotation(s) that are to be applied by performing a reverse multiblade coordination (MBC) transformation on a time-varying yaw function that is defined in a non-rotating reference frame, or on a time-varying tilt function that is defined in a non-rotating reference frame, or on a combination of the time-varying yaw and tilt functions, wherein said time-varying yaw function is indicative for a torsional yaw moment along the rotational yaw direction that induces the oscillatory motion of the rotor axis in the rotational yaw direction and wherein said time-varying tilt function is indicative for a torsional tilt moment along the rotational tilt direction that induces the oscillatory motion of the rotor axis in the rotational tilt direction.

The Multi-Blade Coordinate (MBC) is typically used to transformation moments on the blades from a local blade-frame to a non-rotating, or earth-fixed inertial, frame to determine the loading on, for instance, the tower of the turbine. By defining the time-varying yaw- and/or tilt signal in the non-rotating frame, as described above, the wake can be steered horizontally and/or vertically, and performing a reverse MBC transformation, the signals are transformed to the local blade-frame, such that the controller can be enabled to control the blade pitch driving mechanism to apply the respective oscillating blade pitch rotations to the respective blades for obtaining the enhanced wake mixing. Also, the respective (resulting) torsional yaw and tilt moments enable inducing the oscillatory motion of the rotor axis, as is described above.

It is then also preferred that at least on of the time-varying yaw function and time-varying tilt function is a sinusoidal function having a predetermined frequency, such that the effect of the wake mixing can be optimized, as is described below.

The controller is, preferably, arranged for determining the predetermined frequency on the basis of a diameter of the rotor, a rotational speed of the rotor, an inflow wind speed that is determined upstream of the wind turbine and the Strouhal number, wherein the Strouhal number is preferably between 0.05 and 1.0, more preferably between 0.15 and 0.6 and even more preferably between 0.2 and 0.3, most preferably around 0.25. Hereby, the oscillatory blade pitch rotations are customized to different operational conditions or turbine sizes, such that an increased wake mixing can be obtained for the different operational conditions and turbine sizes. Alternatively, or additionally, the predetermined frequency is preferably determined at least in dependence of the Strouhal number.

The predetermined frequency of the periodic tilt and/or yaw functions can be determined with a dimensionless number called the Strouhal number:

$$St = \frac{fD}{U_\infty}$$

that defines a relationship between the inflow wind speed $U_\infty$, the turbine rotor diameter D and the predetermined frequency f Based on computer simulations using a simulation program, Simulator fOr Wind Farm Applications (SOWFA), for different frequencies in laminar flow conditions it was estimated that an optimal Strouhal number is preferably between 0.05 and 1.0, more preferably between 0.15 and 0.55 and even more preferably between 0.2 and 0.3, most preferably around 0.25. Applying any embodiment with a predetermined frequency, determined according to such a Strouhal number, was found to give an excellent wake mixing.

In a preferred embodiment, a relationship between an amplitude of the applied oscillatory blade pitch rotation and an amplitude of the induced oscillatory motion of the rotor axis in the rotational tilt direction defines a blade pitch-tilt amplification factor and wherein the blade pitch-tilt amplification factor is at least a factor 0.1, preferably at least 0.25, more preferably at least 0.5; and/or wherein a relationship between an amplitude of the applied oscillatory blade pitch rotation and an amplitude of the induced oscillatory motion of the rotor axis in the rotational yaw direction defines a blade pitch-yaw amplification factor and wherein the blade pitch-yaw amplification factor is at least a factor 0.5, preferably at least 1, more preferably at least 2.

Blade pitch-tilt and blade pitch-yaw amplification factors in these ranges allow for an effective amplification of the oscillatory blade pitch rotations for increased wake mixing. By leveraging the blade pitch rotations, less pitching action is required to be provided by the blade pitch driving mechanism. As these mechanisms, in particular the large blade pitch bearings comprised therein, typically have a critical fatigue life, a reduction of the blade pitching leads to an increased life of these mechanisms. In addition, to achieve effective wake mixing, it only requires superimposing relatively small oscillatory blade pitch rotations, such that it reduced the impact on the overall operation (and efficiency) of the wind turbine.

It is further preferred that the blade pitch-yaw amplification factor is dependent on an effective yaw-stiffness and an effective yaw-mass moment of inertia of the wind turbine that are associated to a rotation of the rotor axis along the rotational yaw direction; and/or wherein the blade pitch-tilt amplification factor is dependent on an effective tilt-stiffness and an effective tilt-mass moment of inertia of the wind turbine that are associated to a rotation of the rotor axis along the rotational tilt direction. Hence, the structural properties of the entire turbine, for instance by modifying the stiffness and mass of the tower and/or foundation, or by arranging the rotor shaft with a teeter-hinge having a predefined stiffness that can be determined in dependence of the mass and mass moments of inertia of the rotor, can be tuned such that the desired blade pitch-tilt and blade pitch-yaw amplification factors are obtained. In case of a floating turbine, this can be achieved by tuning the mechanical properties of the floating foundation, such as the mass, mass moment of inertia, center of buoyancy, center of mass, stiffness (that results for instance from the arrangement and properties of the one or more mooring lines).

By changing the above described properties, the Eigenfrequencies of (floating) wind turbine can be tuned on the basis of the (optimal) predetermined frequency (as was described above), such that (for instance) the predetermined frequency is arranged to be spectrally close (i.e. within 25%, preferably within 10%) to the respective Eigenfrequencies that influence to above-described blade pitch-tilt and blade pitch-yaw amplification factors.

It is preferred that the induction factor of the first blade is dependent on the wind speed far away upstream of the first blade and the wind speed at the first blade, wherein, preferably, the induction factor is the ratio between the difference of the wind speed far away upstream of the first blade and the wind speed at the first blade, and the wind speed far away upstream of the first blade.

Typically, the induction factor of the first blade is dependent on the wind speed far away upstream of the first blade and the wind speed at the first blade, wherein, preferably, the induction factor of the first blade (mxi) is the ratio between the difference of the wind speed far away upstream of the first blade ($V_{\infty,1}$) and the wind speed at the first blade ($V_{d,1}$), and the wind speed far away upstream of the first blade ($V_{\infty,1}$), such that:

$$\alpha_1 = \frac{V_{\infty,1} - V_{d,1}}{V_{\infty,1}}$$

Hereby, the induction factor of each blade can be determined.

According to a second aspect, the disclosure relates to a method of operating a wind turbine as described herein. The method may be configured for reducing wake effects of a wake formed downstream of the wind turbine. The method may comprise the step of varying an induction factor of the first blade over time, wherein said induction factor of the first blade is varied by:
  applying the oscillatory variation of the blade pitch angle of the first blade while the rotor rotates around its rotor axis;
  inducing an oscillatory motion of the rotational axis in in the at least one of the rotational tilt direction, the rotational yaw direction and the fore-aft translational direction Preferably, said oscillatory motion of the rotor axis is induced in the at least one of the rotational tilt direction, the rotational yaw direction and the fore-aft translational direction by applying the oscillatory blade pitch rotation of the first blade while the rotor rotates around its rotor axis.

As is described above, the method enables an increased wake mixing in the wake downstream of the turbine.

According to a third aspect, the disclosure relates to a (wind turbine) controller as comprised in the wind turbine according to the embodiments and arranged for executing the method according to the embodiments. Such a wind turbine controller enables to obtain an increased wake mixing in the wake downstream of the turbine.

The present disclosure is further illustrated by the following figures, which show preferred embodiments of the method for controlling the wind turbine according to the disclosure, and are not intended to limit the scope of the disclosure in any way, wherein:

FIG. 1A schematically shows a floating horizontal axis wind turbine comprising a three bladed rotor according to an embodiment of the present disclosure FIG. 1B schematically shows a pitched blade.

FIGS. 2A-2D schematically show a floating vertical axis wind turbine according to an embodiment of the present disclosure, wherein FIG. 2A is a side view, FIG. 2B is atop view, FIG. 2C is a detailed tip view of the central vertical axis and support elements connecting the central vertical axis with the blades of the wind turbine, and FIG. 2D is a detailed cross-section through one of the blades showing the pitching angle.

FIG. 3 schematically shows a nacelle and rotor of the wind turbine according to the embodiment of FIGS. 1A and 1B.

FIG. 4 schematically shows an array of two floating wind turbines, wherein the second wind turbine is arranged downstream in a wake of the first wind turbine.

FIG. 5 schematically shows, as a first example, a floating wind turbine that swings in the tilt direction due to applying an oscillatory collective blade pitch rotation.

Figure 10:
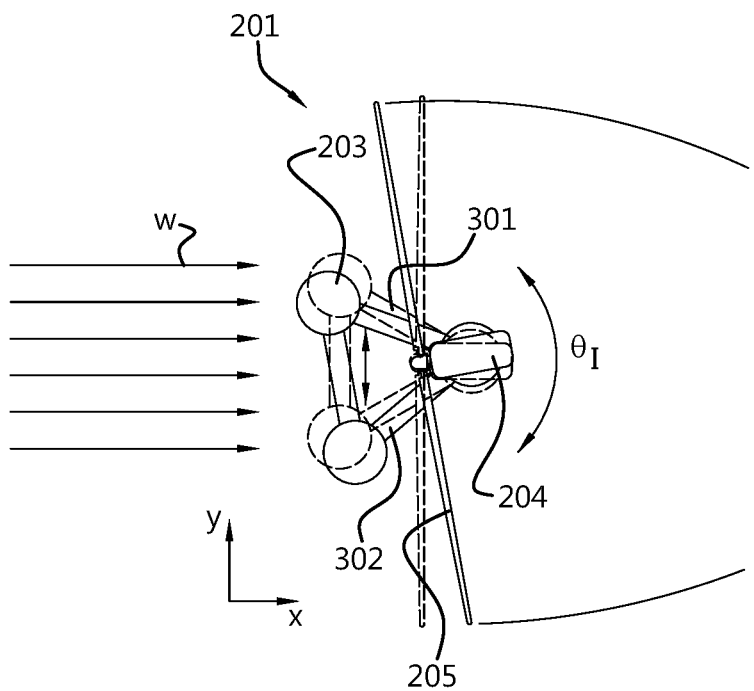

FIG. 10 schematically shows, as a second example, a floating wind turbine that swings in at least the yaw direction due to applying an oscillatory individual blade pitch rotations.

Figure 11A:
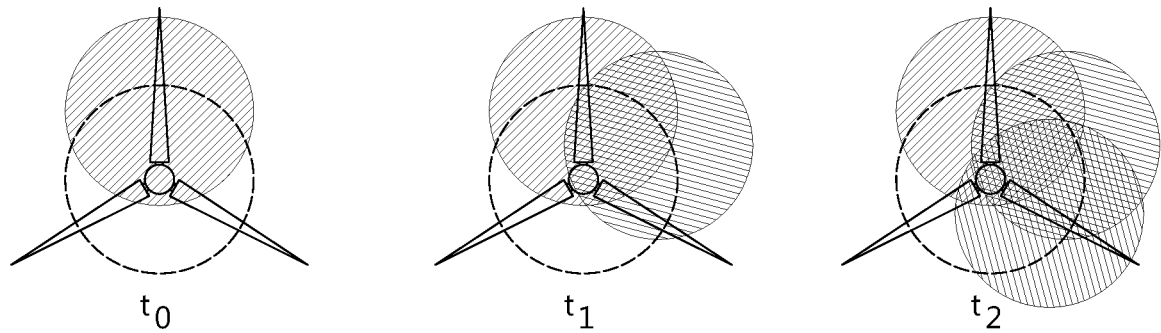
Figure 11B:
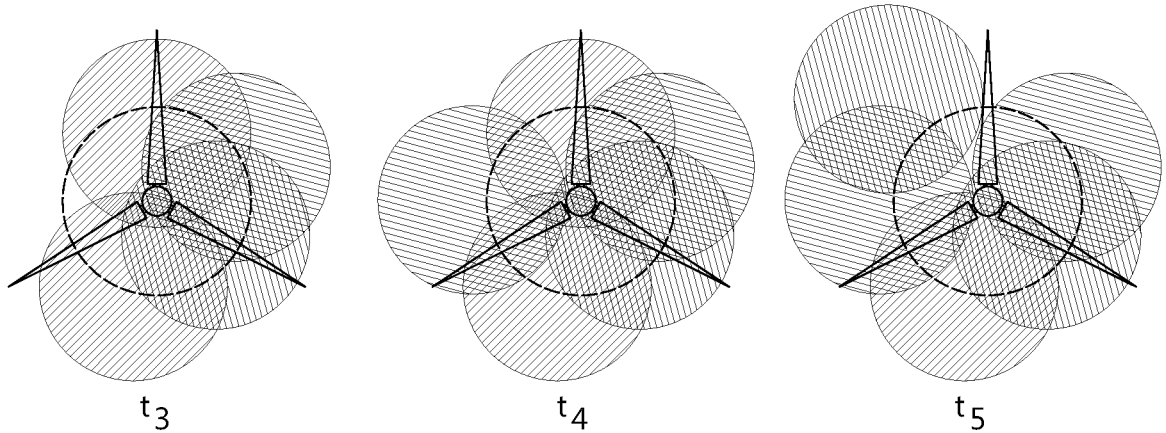

FIG. 11 schematically shows, for the second example, the location of the wake with respect to (the center) of the rotor plate at different time instances during rotating of the rotor for a turbine controlled using the oscillatory individual blade pitch rotations.

Figure 12:
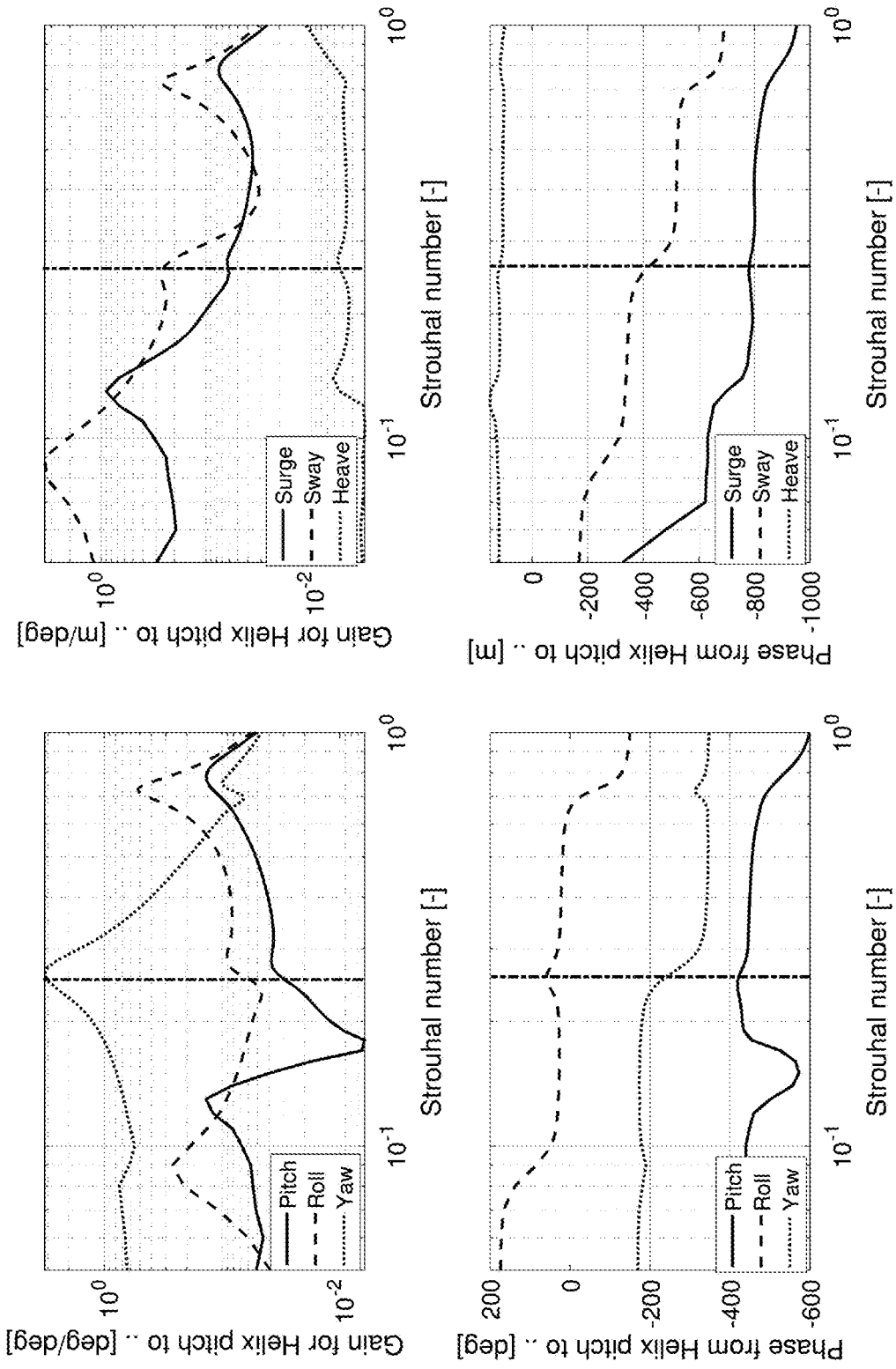

FIG. 12 shows the amplifications factors (i.e. gains) from applying the oscillatory individual blade pitch rotations to the motions of the turbine of the second example.

Figure 13:
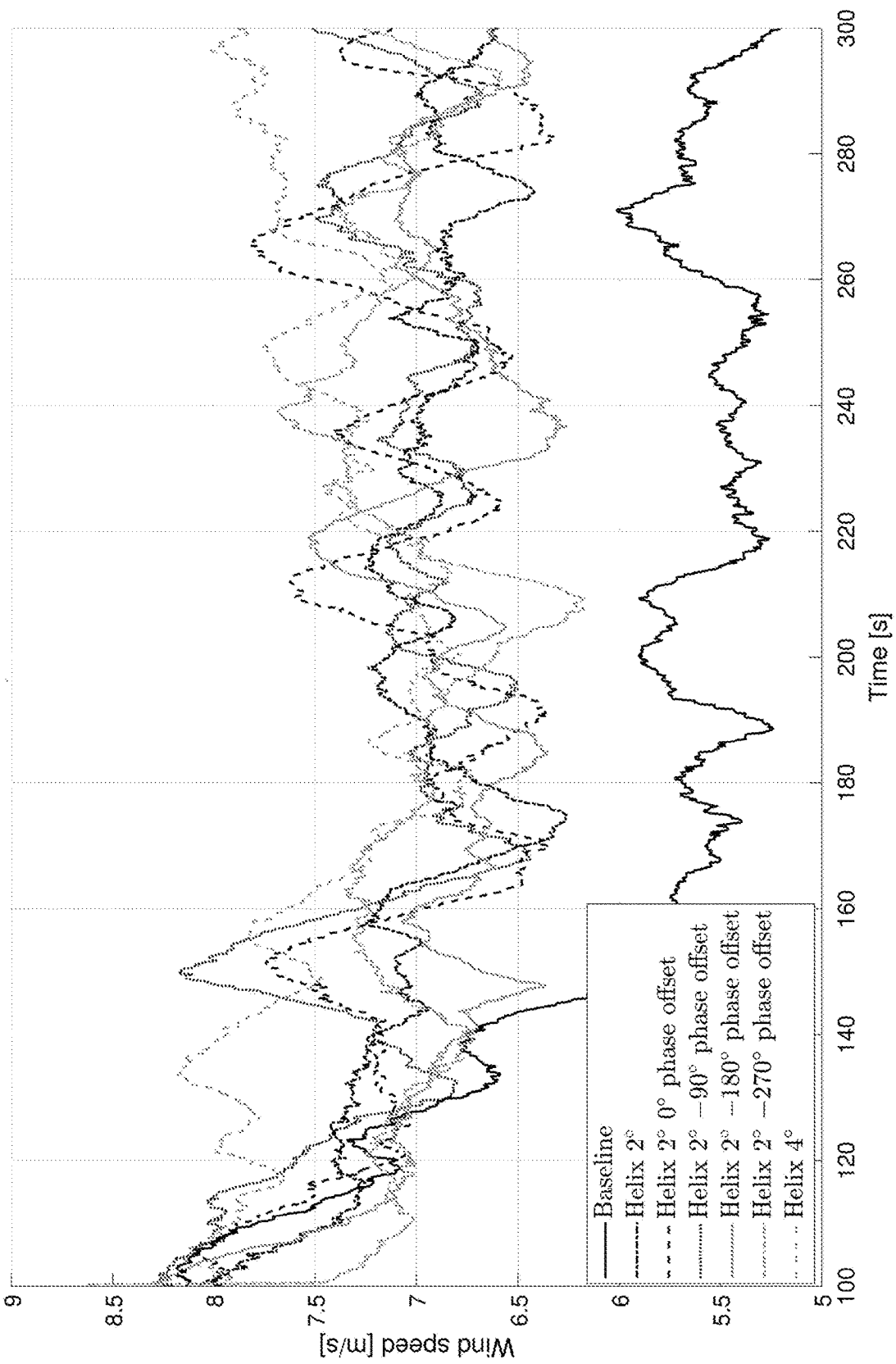

FIG. 13 shows, for different test cases of the second example, the effect the oscillatory individual blade pitch rotations have on the wind speed in the wake downwind of the turbine.

Figure 14:
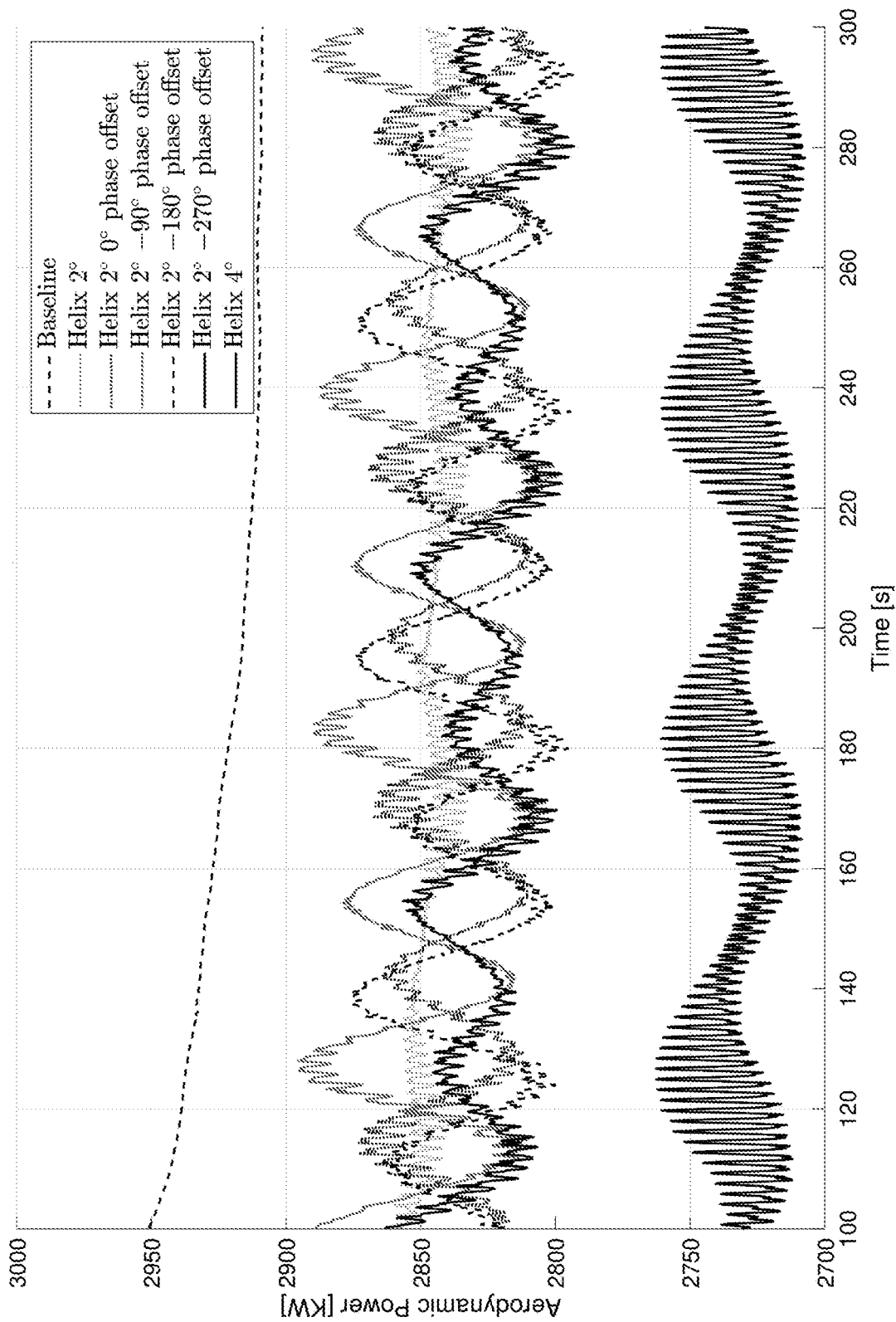

FIG. 14 shows, for the different test cases of the second example, the effect the oscillatory individual blade pitch rotations have on the (aerodynamic) power output of the wind turbine.

Figure 15:
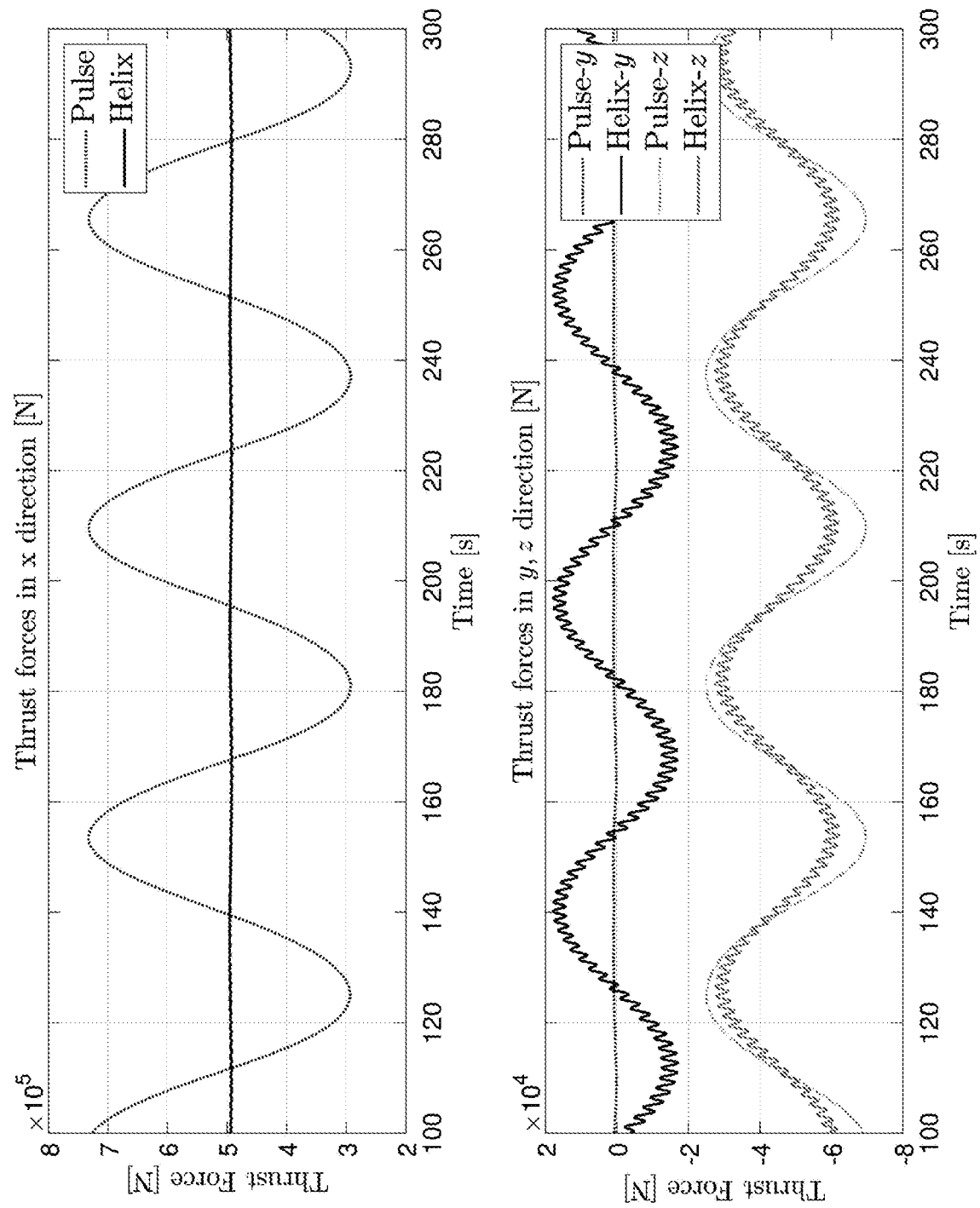

FIG. 15 shows the effect of the control strategy of the first and second examples on the amplitude and orientation of thrust force that is experienced by the wind turbine.

Figure 1A:
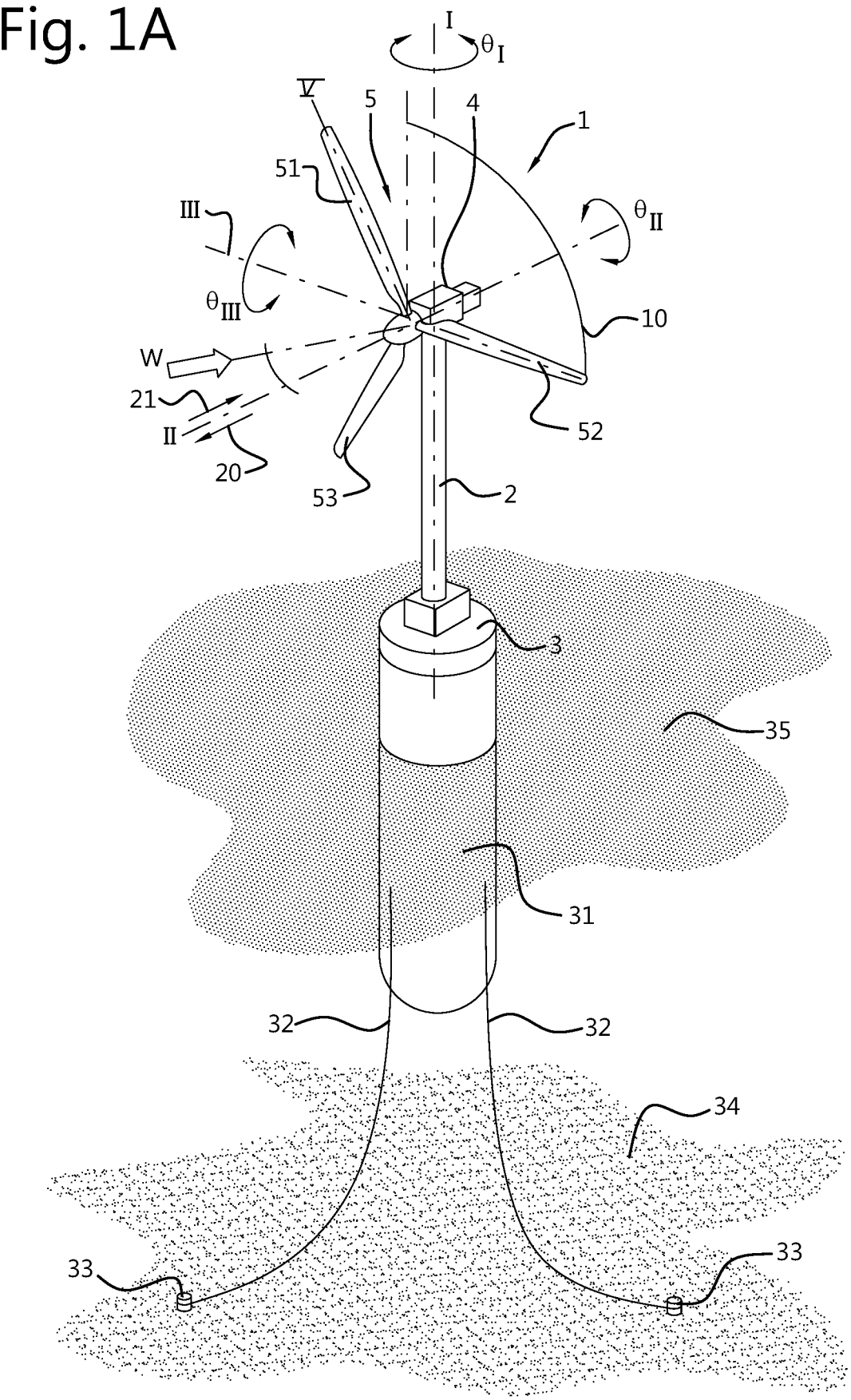

FIG. 1A schematically shows the layout of a typical three bladed horizontal axis wind turbine (HAWT) 1, in particular a floating offshore wind turbine (FOWT). The wind turbine comprises a tower 2, situated on top of a foundation 3, in particular floating foundation 3. The floating foundation 3 extends from the water surface 35 and comprises a buoyant body 31. Mooring lines 32 are provided and are connected to the buoyant body 31 at a first end of the lines and coupled to the seabed 34 using anchors 33 that are connected at the other end of the mooring lines, to keep the FOWT 1 into place. The main difference between floating wind turbines and fixed-bottom turbines is the fact that a FOWT 1 has 6 extra degrees of freedom that need to be taken into consideration. As there is some slack in the mooring lines, a FOWT 1 is not rigidly connected to the seabed 34 but capable of moving around. Movement outside of this area is restricted by the increasing tension in the mooring lines 32 as the FOWT 1 moves away from its original position.

Figure 1B:
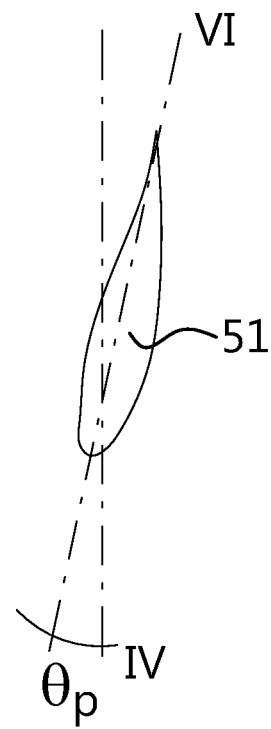

A nacelle 4, which is coupled to a rotor 5, is arranged on top of the tower 2. The rotor 5 comprises three blades 51, 52, 53, although any amount of blades is possible, for instance one, two or four blades can also be applied. The blades 51, 52, 53 are fixed to a hub 54. A rotation of the nacelle 4 around the vertical axis I, which is substantially parallel, or coincides, with the tower 2 and which is substantially perpendicular to the ground plane, is referred to as a yaw rotation (01). The yaw angle can be defined in dependence of a wind direction, in which case a non-zero yaw angle means that there is a misalignment between the direction of the rotor axis II and the wind direction W. The rotor 5 is arranged to rotate around the rotor axis II in the azimuth (rotational) direction ($\theta_{II}$). This rotation may also be referred to as the azimuth rotation and may be briefly denoted by the same reference ($\theta_{II}$). The rotational tilt direction ($\theta_{III}$) is a rotational direction around a tilt axis III that is substantially horizontal and substantially parallel to the rotor plane 10. The blades 51, 52, 53 are furthermore arranged to rotate around their respective longitudinal axis V, which rotation is referred to as the pitch rotation and an angle between a central axis VI of a cross section the blade 51, 52, 53 with respect to plane of rotation (rotor plane 10) of the rotor 5 is referred to as the pitch angle. FIG. 1B shows the central axis VI of the cross-section of the first blade 51 being pitched at a pitch angle $\theta_P$ with respect to the rotor plane 10. FIG. 1A also shows the fore-aft translational direction (i.e. the forward translation direction 20 and rearward translation] direction 21) of the rotor 5.

FIGS. 2A-2D schematically show other embodiments of a floating offshore wind turbine (FOWT) 11. In these embodiments the wind turbine is a multi-blade vertical axis wind turbine (VAWT) 11. The VAWT 11 may have two blades 31 and 32 (as shown in the figures), in other embodiments the VAWT has more than two blades. The blades 31, 32 are connected via lower and upper support elements 33, 34 to a substantially vertical rotor axis 22. Hence, whereas in an HAWT the blades are connected to a substantially horizontal rotor axis, in the present embodiment the blades 31, 32 are connected via support elements to the substantially vertical rotor axis 22.

Figure 2A:
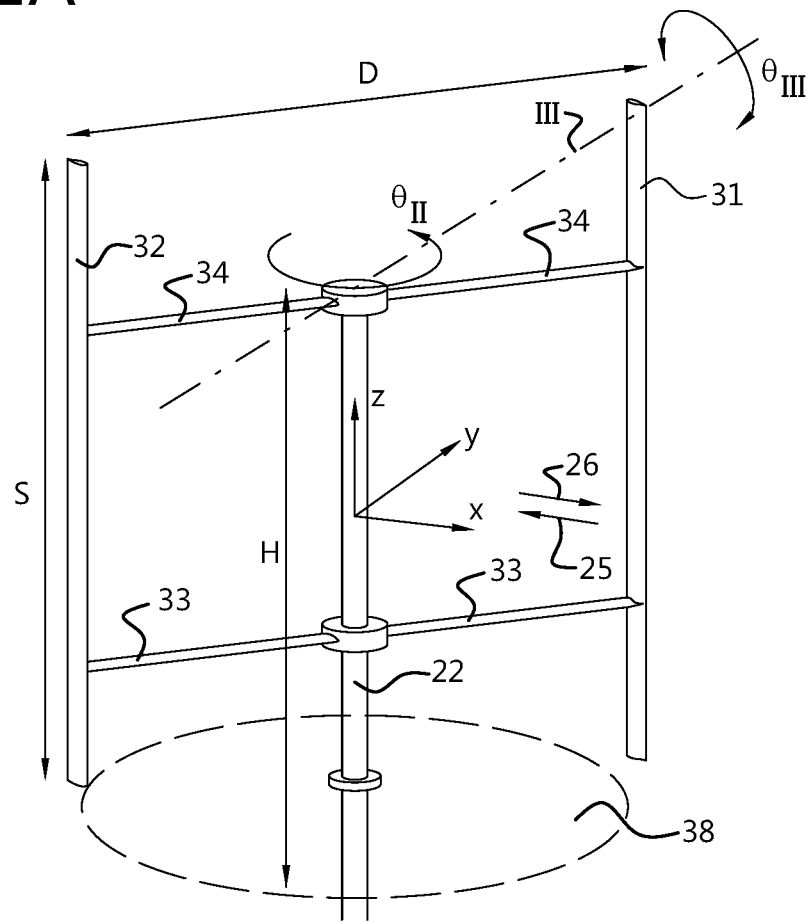
Figure 2B:
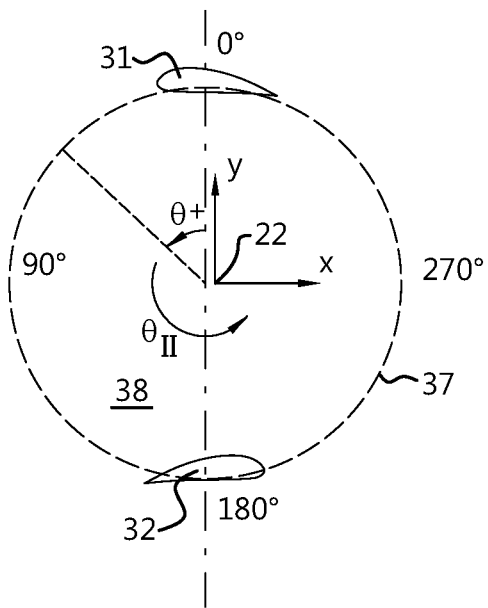

Referring to FIG. 2B, the blades 31, 32 follow a circular trajectory 37 (denoted with a dashed line) around the central vertical rotor axis 22. The movement of the blades 31, 32 defines a horizontal rotor plane 38 that extends perpendicular to the vertical rotor axis 22.

Figure 2C:
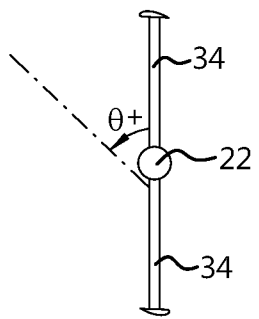

The vertical rotor axis 22 is rotatable in an azimuth (rotational) direction ($\theta_{II}r$). Furthermore, as shown in FIGS. 2B and 2C, when the angle $\theta$ defines the blade azimuthal position relative to the central vertical rotor axis 22 and this angle is defined with respect to the first blade 31 (i.e. angle $\theta$ is 0 degrees for the first blade 31), the azimuthal angle $\theta$ of the second blade 32 is about 180 degrees. In other words, the second blade 32 lags relative to the first blade 31 by about 180 degrees. In the situation shown in FIG. 2B, the azimuthal angle $\theta$ of 90 degrees corresponds to the most upwind position and the azimuthal angle of $\theta$ of 270 degrees corresponds to the most downwind position.

The figures also indicate the fore-aft translational directions of the turbine are indicated (respectively the forward translation direction 25 and rearward translation direction 25, in the arrangement of FIG. 2A corresponding to a positive x-direction and negative x-direction, respectively) of the vertical rotor 22. A yaw rotation of the wind turbine similar to the above-described yaw rotation of the HAWT, essentially does not play a role in the present HAWT turbine. However, movement in the yaw (rotational) direction of the movable platform may indeed occur, of course. The rotational tilt direction ($\theta_{III}$) is defined as the rotational direction around an imaginary tilt axis III (FIG. 2A, parallel to the y-direction) that is substantially horizontal and substantially parallel to the rotor plane 38.

Figure 2D:
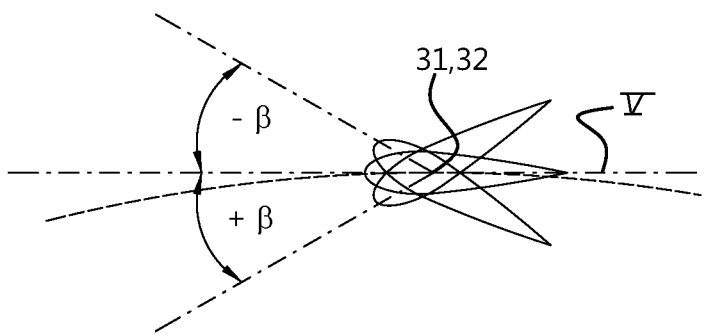

FIG. 2D indicates that each of the blades 31, 321 may rotate around a respective longitudinal axis V, which rotation is referred to as the pitch rotation and the angle R between a central axis of a cross section the blade 31, 32 with respect to the plane of rotation (rotor plane 38 of the rotor 22 is referred to as the pitch angle (wherein a negative angle R is defined as pitching in toward the centre of rotation which corresponds to an increase in the angle of attack for each azimuthal position of the blade 31, 32, while a positive angle R corresponds to a decrease in the angle of attack).

Figure 3:
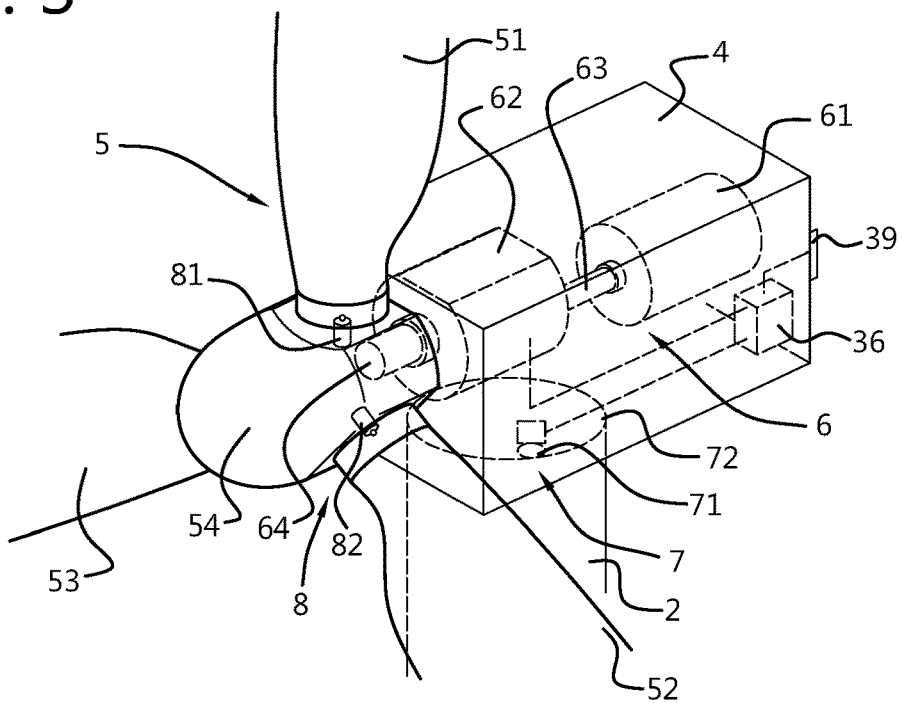

FIG. 3 schematically shows a nacelle 4 and rotor 5 of the wind turbine 1, wherein different components arranged in the nacelle 4. The nacelle 4 houses the drive train 6, that can comprise a generator 61 for generating electrical energy, a gearbox 62 arranged between a high-speed shaft 63 and low speed shaft 64, wherein the low speed shaft 64 is connected to the rotor 5 and the high-speed shaft 63 transfers the rotation from the output of gearbox 62 to the generator 61. Note that in so called direct drive wind turbines the rotor is directly connected, usually through a main shaft, or low speed shaft, to a generator. In these types of wind turbines, the gearbox 62 and high-speed shaft 63 are not needed.

Furthermore, the nacelle 4 typically also comprises a yaw mechanism 7 for yawing the nacelle 4 around the tower 2, in particular the vertical axis I. The yaw mechanism 7 can comprise a number of yaw motors 71 attached to a base of nacelle 4 and comprising a gearing for reducing the rotational speed towards an output drive pinion that can be meshed with a gear rim 72 with teeth on the inner side, which in turn is connected to a top of the tower 2. Furthermore, a blade pitch driving mechanism 8 is comprised (at least partially) in the hub 54, wherein the blade pitch driving mechanism 8 is arranged for pitching the blades 51, 52, 53. In the current embodiment of the turbine 1, the blade pitch driving mechanism 8 comprises three pitch drives 81, 82, 83 (such as hydraulic cylinders or electric motors) that are arranged to drive the ends of blade root sections 55, 56, 57 of the respective blades 51, 52, 53. The pitch drives 81, 82, 83 are arranged to individually drive the pitch rotations of the respective blades 51, 52, 53, such that the blades 51, 52, 53 can all have different pitch angles at any given time. Such a pitch mechanism 8 is also referred to as an individual blade pitch driving mechanism and controlling the individual pitch mechanism for minimizing the fatigue loading on a turbine is referred to as Individual Pitch Control (IPC). The figure furthermore shows in a schematic manner a controller 36 connected to the blade pitch driving mechanism 8, optionally also to the yaw mechanism 7. The controller 36 is configured to control the induction factors of the one or more blades (together as one or individually). This is accomplished in that the controller 36 is configured to control the blade pitch driving mechanism 8 connected to the controller 36 to apply a suitable oscillatory blade pitch rotation to at least one of the blades of the wind turbine (preferably to each of the blades of the wind turbine) so as to induce an oscillatory motion of the rotor axis in the at least one of the rotational tilt direction and the fore-aft translational direction, and optionally also in the rotational yaw direction.

The controller 36 may control the blade pitch driving mechanism 8 to impose onto the rotor axis of the wind turbine a suitable oscillatory movement. In case the frequencies or frequency ranges of the movements (per movement type) of the rotor axis as a result the movements of the support structure, for instance the movements caused by wave action in case of a floating support structure, at least partially overlap with the frequency ranges to be used by the wind turbine to provide an optimal power output on the wind farm level, then use can be made of the moving (support for the) rotor axis to achieve the optimal power output using even smaller pitch angles, which in turn may even further improve the power output at the wind farm level. In other words, the controller may be configured (in case of floating wind turbines) to have the blade pitch driving mechanism 8 vary the pitching angles of the one or more blades substantially synchronously with the wave motion so that smaller variations in pitching angles are needed to achieve a suitable wake. For instance, the phase of the excitation signal can be adapted on the basis of incoming waves to be detected. This reduction of the pitching angles has the advantage that the wind turbines in a wind farm may further increase the power output.

Figure 4:
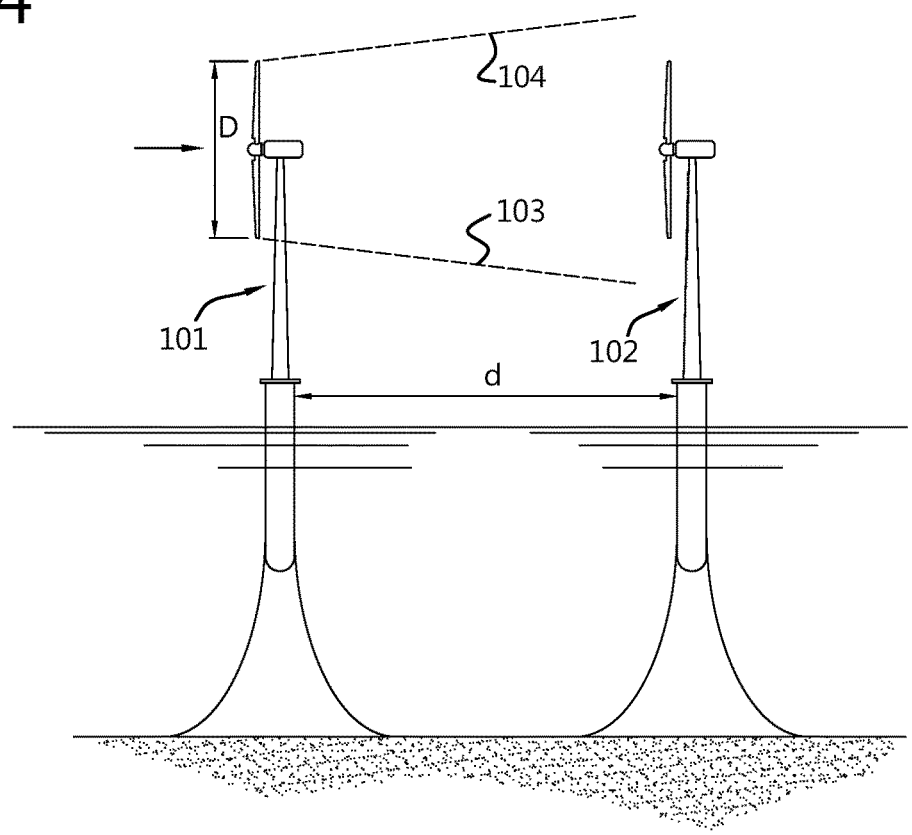

In embodiments of the present disclosure the controller 36 is connected to one or more suitable motion sensors 39 (FIG. 4). The motion sensor 39 is configured to sense the motion of the support structure, for instance of the nacelle 4 to which the motion sensor is attached in the configuration of FIG. 4. However, if a motion sensor is arranged at another part of the support structure, for instance the tower, the floating movable foundation structure, the buoyant body and the like, the motion of (other parts of) the support structure are sensed. The motion sensor generates a motion signal representative of the motion of the supporting structure. The controller 36 may be configured to vary the induction factor of the at least one blade based on—possibly amongst others—the received motion signal.

The motion sensor 39 may be an accelerometer configured to determine the acceleration (and thereby the speed or positions) imparted to the sensor and thereby to the part of the support structure to which it is attached. In other embodiments the motion sensor is a radar or similar imaging device configured to determine the movements or expected movements of the support structure based on the detection of incoming waves.

FIG. 4 schematically shows an array of two floating wind turbines, wherein the wind direction W is such that the second wind turbine 102 is positioned downstream in a wake of the first wind turbine 101. The wake can be considered a region, as indicated between dashed lines 103, 104, of reduced (average) wind speeds with an increased turbulence. The wake caused by the wind turbine 101 will slowly mix with the surrounding (unaffected) wind field and due to this mixing the wake effects will reduce with increasing distance from the turbine. Turbines 101, 102 are typically placed at mutual distances d of three to ten times the rotor diameter (3D-10 D), wherein a mutual distance of ten times the rotor diameter will obviously lead to lower wake effects, such as a reduced power output and reduced vibrations and thereby reduced induced fatigue loading on different wind turbine components, than a mutual distance of only three times the distance. Nonetheless, as already described above, a wind farm typically has to be developed within a limited space, such that the longer mutual distances might lead to a reduced power output of the entire farm and thereby a higher cost of the generated energy. It is thus beneficial to be able to increase the wake mixing and to reduce the length and/or intensity of the wake, such that turbines can be placed at smaller distances, while still providing a higher power output with less induced fatigue loading.

Two different case studies (i.e. examples) using a wind turbine according to the disclosure have been performed in order to demonstrate the above described effects, as will be discussed in more detail below. These case studies have been performed on the basis of realistic simulations using OpenFAST, which is an open-source wind turbine simulation tool made available by the National Renewable Energy Laboratory (NREL); Qblade, which is an open-source, cross-platform simulation software for wind turbine blade design and aerodynamic simulation originally developed by the TU Berlin; and SOWFA (Simulator fOr Wind Farm Applications), which is a set of computational fluid dynamics (CFD) solvers, boundary conditions, and turbine models made available by the National Renewable Energy Laboratory (NREL). SOWFA is based on the OpenFOAM CFD toolbox and includes a version of the turbine model coupled with FAST.

Figure 5:
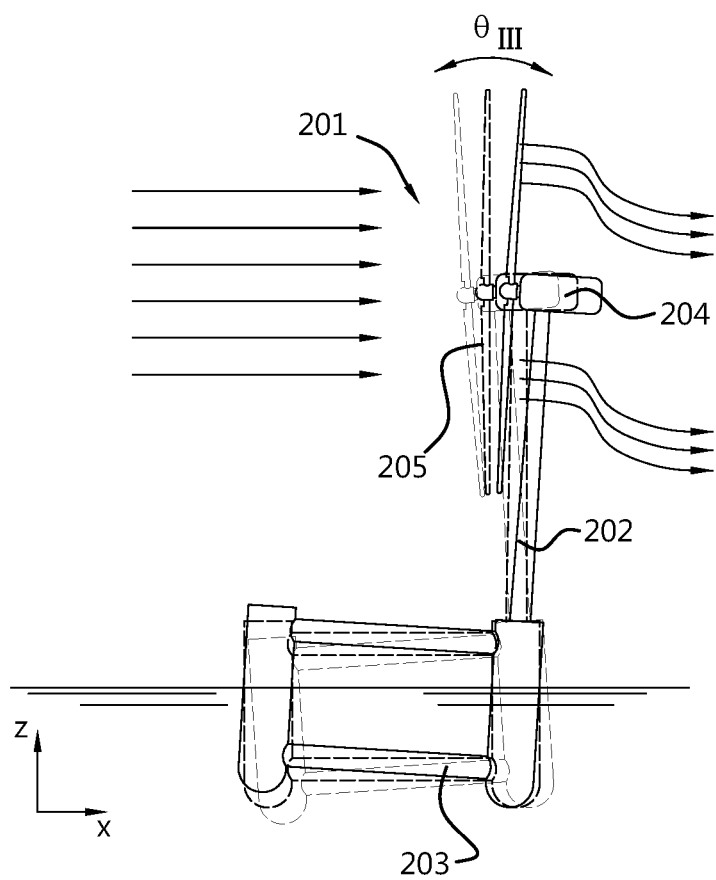

FIG. 5 schematically shows, as a first example, a floating wind turbine 201 that swings in the tilt direction due to applying an oscillatory collective blade pitch rotation. Wind turbine 201 is similar to the wind turbine 1 shown in FIG. 1 and comprises a tower 202, floating foundation 203, nacelle 204 and rotor 205. The floating foundation 203 shown is of the semi-submersible type. The wake downstream of the turbine shows a pulse like behaviour, as is described later, such that applying the oscillatory collective blade pitch rotation is also referred to also the "Pulse Input".

A simulation has been carried out in OpenFAST using the DTU 10MW turbine on the TripleSpar platform. This turbine and platform combination has been the subject of extensive research, including experimental validation. Relative to the platform type, the type of turbine has little effect on the motions of the platform. Therefore, the results obtained in this grid search can be used for other (large) offshore turbines, for example the NREL 5MW reference turbine. These turbines have a rotor diameter D=126.4 m. For each sample point related to a certain Strouhal number, each of the motions of the platform is logged for a simulation time of 1000 s. This simulation time ensures that steady state operation has been reached. Furthermore, the sea state is assumed to be perfectly smooth, i.e., there are no waves present. From this data, it is possible to extract the relations between the platform motions, i.e. the motions of the floating wind turbine and thereby at least one of a rotational tilt direction, a rotational yaw direction and a fore-aft translational direction of the rotor axis, and the applied oscillatory blade pitch rotations.

For both the first and second example (which is described below), a number of simulations are executed for a range of excitation frequencies characterized by the dimensionless Strouhal number $$St = \frac{fD}{U_\infty}$$

that defines a relationship between the inflow wind speed $U_\infty$, the turbine rotor diameter D and the predetermined frequency f. The range is chosen to be between St=0.05 and St=1.0, and the uniform inflow velocity is set at $U_\infty$=9 m/s for all simulations.

Figure 6:
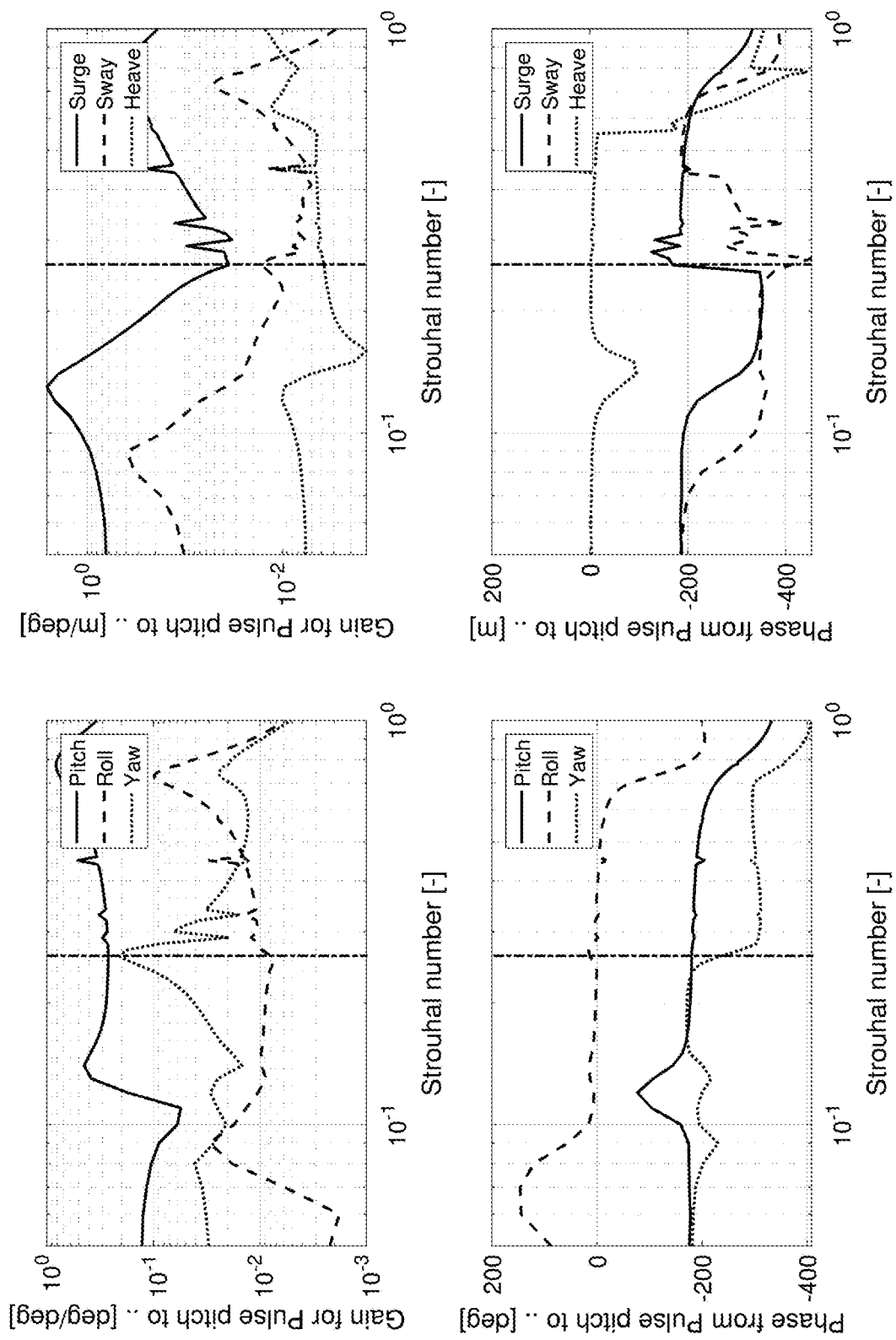
FIG. 6 shows the amplifications factors (i.e. gains) from applying the oscillatory collective blade pitch rotations to the motions of the turbine of the first example.

The results are shown in FIG. 6. The vertical dotted line indicates a Strouhal number of St=0.25. This value was experimentally found to give the optimal wake mixing. From FIG. 6, it is clear that tilt rotation is the dominant motion for the FOWT across a large range of Strouhal numbers. The amplification in yaw direction is unexpected as this is primarily caused by a variation of thrust in y direction (a direction parallel to the tilt axis III) which is not present. It shows that there is further coupling between different motions of the platform. At St=0.25, the gain on the translations of the platform are between 1 to 2 magnitudes lower than the rotational degrees of freedom. The phase between Pulse input and platform tilt output is −180 degrees, where the minus sign indicates phase lag. This can be interpreted as follows: When the thrust is minimal, the turbine is tilted completely towards the rear. When the thrust is at its maximum the turbine is fully tilted towards the front. FIG. 5 shows a schematic depiction of the platform pitching motion, i.e. tilt rotations $\theta_{III}$ around an axis that is substantially parallel to tilt axis III, that is expected for the Pulse.

As the platform is tilting backwards, the effective wind speed experienced by the blades of the turbine is lowered, because the relative wind velocity will be lower. When the platform is tilting forward the opposite will happen: the effective wind speed will be higher, as is schematically indicated in FIG. 5. This will have a positive effect on the level of wake mixing, as this results in lower blade pitch angles (i.e. a reduced amplitude of the blade pitch rotations) for the Pulse resulting in overall higher levels of wake mixing and a reduction of the wake effects in the wake downstream of the turbine.

Figure 7:
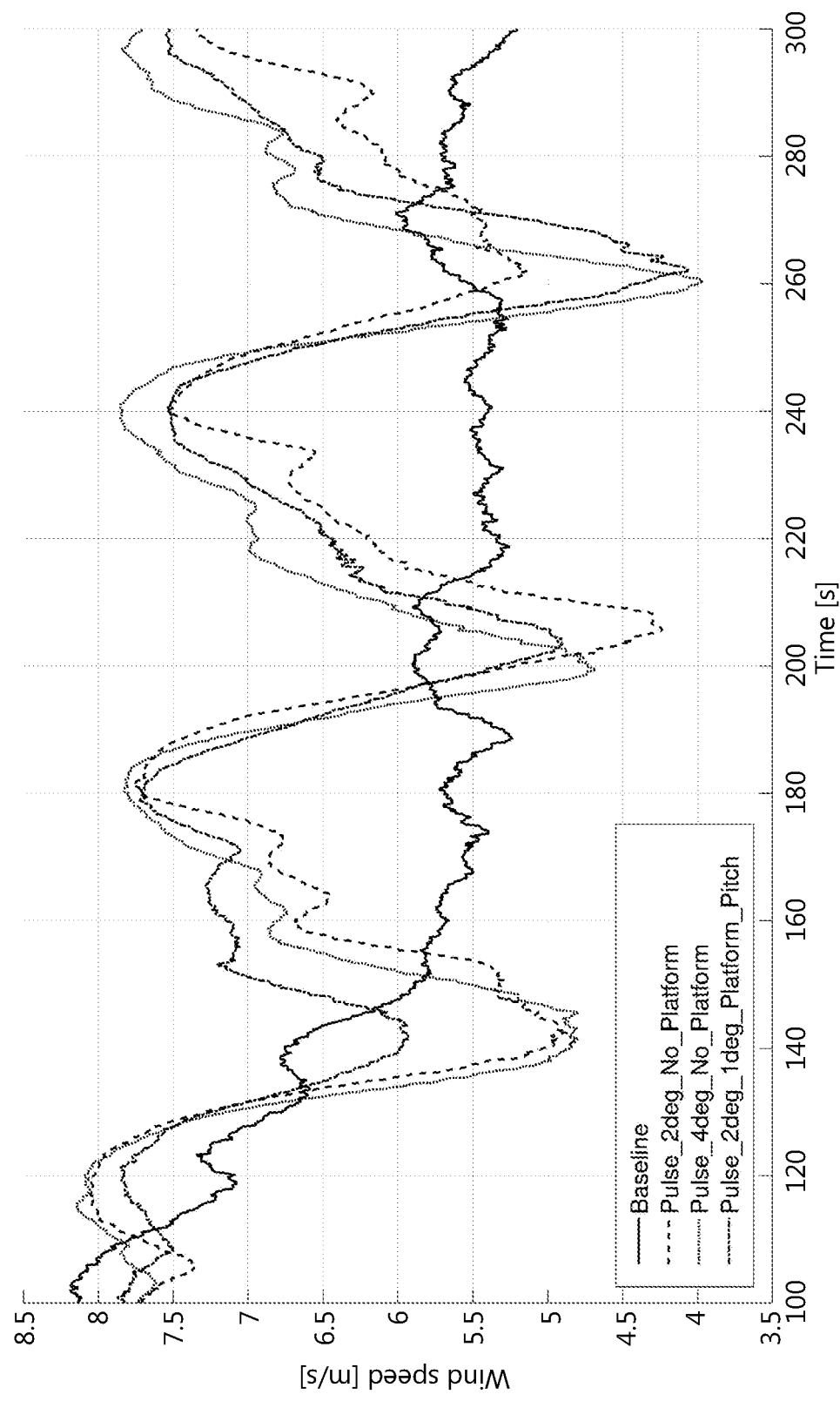
FIG. 7 shows, for different test cases of the first example, the effect the oscillatory collective blade pitch rotations have on the wind speed in the wake downwind of the turbine.
Figure 8:
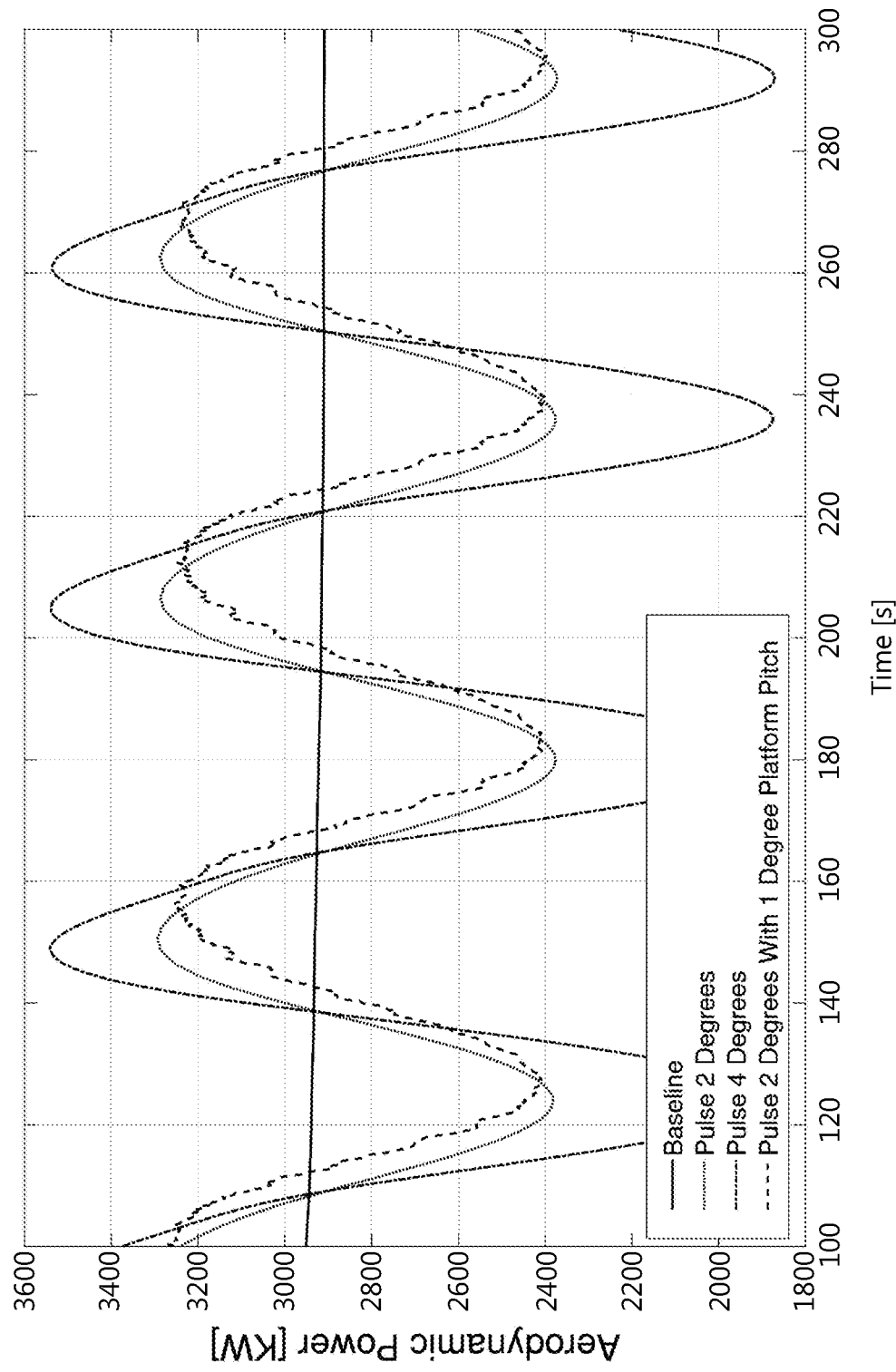
FIG. 8 shows, for the different test cases of the first example, the effect the oscillatory collective blade pitch rotations have on the (aerodynamic) power output of the wind turbine.

FIGS. 7 and 8 show, for different test cases of the first example, the effect the oscillatory collective blade pitch rotations have on the wind speed in the wake downwind of the turbine, and the effect on the (aerodynamic) power output of the wind turbine. During the simulation, the blades are given an sinusoidal collective oscillatory blade pitch rotation having a predetermined amplitude (see below) at the predetermined frequency as is determined using the dimensionless Strouhal number (as was described before). The aerodynamic power output is the power available at the rotor shaft and does not take any losses in the rest of the wind turbine into account. In the simulations presented here, the motions of the platform are prescribed, such that the motions of the platform and turbine are (dynamically) decoupled. Using the Bode gain and phase plots in FIG. 6 a known input signal for the Pulse can be transformed to the corresponding motions of the platform. The initial integration of the (publically available) Delft Research Controller into Qblade had been tested using the NREL 5MW turbine. As that set-up was available and working as intended, the NREL 5 MW was also used for further simulations. Because the motions of the FOWT are dominated by the platform design it is expected that the Bode diagrams for the NREL 5MW turbine with the TripleSpar platform will be comparable to those presented in FIG. 6.

Based on the results presented in FIGS. 6, several case studies were set up for the first example. The goal is to evaluate the effect the motion of the platform has on the wake. For all of the cases, the excitation frequency will be kept at St=0.25. For the Pulse the following cases will be considered:

1.1. Collective blade pitch rotations (i.e. the Pulse Input) with an amplitude of 2 degrees and no platform motion.
1.2. Collective blade pitch rotations (i.e. the Pulse Input) with an amplitude of 2 degrees and 1 degree platform motion (i.e. an amplitude of 1 degree around rotational tilt direction).
1.3. Collective blade pitch rotations (i.e. the Pulse Input) with an amplitude of 4 degrees and no platform motion.

The first case serves as a baseline for the Pulse applied to a fixed-bottom turbine. The case 1.2 is the same as case 1.1 but with platform pitching. Case 1.3 serves to compare the results of a fixed-bottom turbine with double the amplitude compared to case 1.2. The motion of the platform is limited to the pitch direction for two reasons. First, it is the dominant motion for the pulse, and second, it limits the variables that are being changed between cases. It also allows for discerning what effect each motion has on the wake.

In this section the results for the aforementioned cases is presented. FIG. 8 shows the extracted aerodynamic power by the turbine for the three cases considered for the Pulse as compared to a normal (baseline) case. It is clear that at lower amplitudes, the power variation on the turbine is also lower. Interestingly, the power extraction for a pitching FOWT does not differ much from a fixed-bottom turbine with the same pulse amplitude.

FIG. 7 shows the average wind speed measured across a disk at distance 5D (i.e. five times the rotor diameter) downwind. Included in the graph is a baseline measurement as reference. The cyclic nature of the pulse is also clearly present in the wind speed experienced by a potential downwind turbine. From FIG. 7, we see that the average wind velocity profile of the turbine with platform is, generally speaking, closer to a fixed bottom turbine with four degrees of pitch amplitude than that of the two degrees amplitude case.

The table below shows a summary of the time averaged results and the procentual difference with respect to the baseline. For all the Pulse scenarios, there is an overall gain in wind speed in the wake, and thus an increased wake mixing. The downside of increasing the amplitude is that the average power extracted by the turbine is lowered. From the results presented in the table it follows that a moving platform provides a benefit to the overall system both in terms of wake mixing as well as power extraction. As was noted earlier, the added movement of the turbine can be seen as an effective change in induction. By allowing the platform to move the pitch angles can be lowered resulting in an increase in power generation for the upwind turbine. Furthermore, the tilt rotational platform motion (TPM) results in a positive contribution to the level of wake mixing, being only slightly worse than a fixed-bottom turbine with double the pitching amplitude.

|  | Baseline | 2° Pulse; No PM | Pulse 4°; No PM | Pulse 2°; 1° TPM |
|---|---|---|---|---|
| Average Windspeed [m/s] at 5D | 5.69 | 6.22 (+9.3%) | 6.53 (+14.8%) | 6.51 (+14.4%) |
| Average Power [kW] | 2916 | 2852 (−2.2%) | 2764 (−5.2%) | 2859 (−2.0%) |

Figure 9:
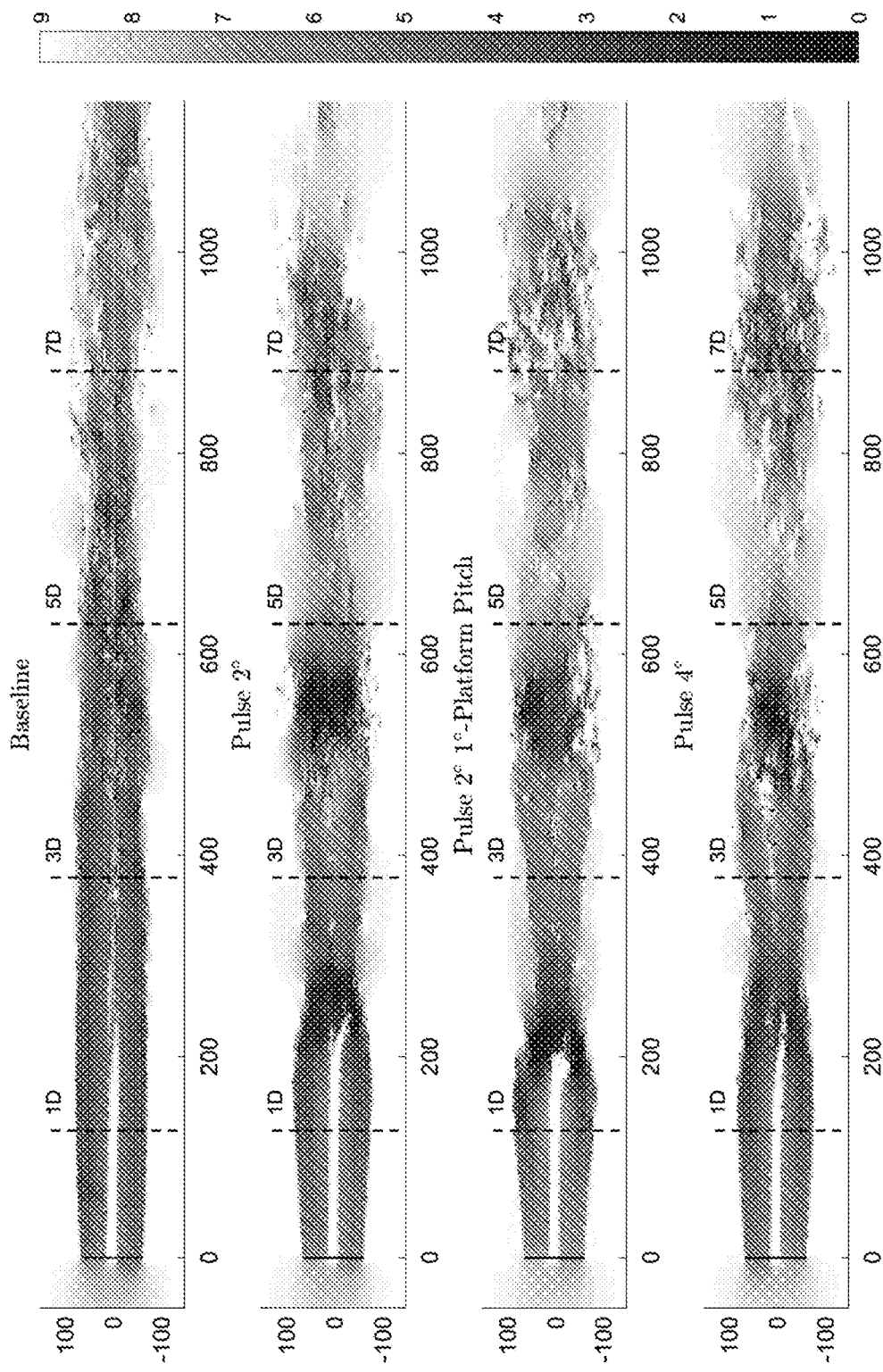
FIG. 9 shows in a top view, for the different test cases of the first example, the effect the oscillatory collective blade pitch rotations have on the wake formed downstream of the turbine.

FIG. 8 shows the top view of the wakes for the three pulse cases as well as the baseline. The pulsing nature of the turbine is clearly visible in the wake of the turbine where the darker areas indicate a lower velocity. The contraction and expansion of the wake due to the changing induction is most visible for the case with pulse amplitude of 4 degrees. The difference between the fixed-bottom and floating turbine is slightly more difficult to see from FIG. 9.

FIG. 10 schematically shows, as a second example, the floating wind turbine 201 that swings in at least the yaw direction due to applying an oscillatory individual blade pitch rotations. The pitch rotation of the blades of the rotor 205 are individually controlled, such that each (of the three blades) is given the same oscillatory pitch rotation, but wherein the second blade is given a phase offset of 120 degrees with respect to the first blade and the third blade is given a phase offset of 120 degrees with the second blade (phase-offset due to the fact that the blades are 120 degrees spaced apart along the azimuth angle of rotation of the rotor). This allows oscillating the respective blade pitch rotations of the respective blades in an out-of-phase manner. Thereby, the first blade can for instance be pitched such that a maximum blade induction factor is obtained, whereas the second blade and third are be pitched such that a lower blade induction factor is obtained simultaneously. Hereby, the total induction factor of the rotor can be kept substantially constant, such that the effect on the power production is reduced, while at the same time increasing the wake mixing in the wake formed downstream. It is seen that due to this, the location of the thrust force oscillates between a first and a second location (as indicated by arrows 301, 302), which cases an oscillating moment along the rotational yaw direction. In addition, by providing such oscillatory blade pitch rotations, a helix shaped wake can be formed downstream of the turbine wherein wake mixing is increased. Therefore, this example is referred to as "Helix Input", or simply "Helix". Note that similar simulations are performed for the second example, as have been performed for the first example.

During the simulation, the blades are given an sinusoidal individual oscillatory blade pitch rotation having a predetermined amplitude (see below for the respective simulation cases), wherein the individual pitch rotations are based on the predetermined frequency that is determined using the dimensionless Strouhal number (as was described before).

The individual pitch rotations can be determined as follows. An inverse multiblade coordinate (MBC) transformation step is applied for obtaining the individual oscillatory blade pitch rotations $\theta_1$, $\theta_2$, $\theta_3$ of the respective blades 51, 52, 53. A MBC transformation decouples, or stated differently: projects, the blade loads in a non-rotating reference frame and is a transformation used in for instance Individual Pitch Control approaches that aim at lowering fatigue loading of the wind turbine. The rotor speed dependent n-times-per-revolution (nP) load harmonic is transferred to a steady-state contribution, simplifying controller design. The equations effectuating the transformation are summarized. The measured out-of-plane blade root bending moments M(t) ERB are supplied to forward transformation, transforming the rotating blade moments into a non-rotating reference frame (as also shown in for instance step 207):

$$\begin{bmatrix} M_{0,n}(t) \\ M_{t,n}(t) \\ M_{y,n}(t) \end{bmatrix} = T_n(\psi) \underbrace{\begin{bmatrix} M_1(t) \\ M_2(t) \\ M_3(t) \end{bmatrix}}_{M(t)}, \text{with}$$

$$T_n = \frac{2}{B} \begin{bmatrix} 1 & 1 & 1 \\ \cos(n\psi_1) & \cos(n\psi_2) & \cos(n\psi_3) \\ \sin(n\psi_1) & \sin(n\psi_2) & \sin(n\psi_3) \end{bmatrix},$$

in which $n \subset Z^+$ is the harmonic number, $B \in Z^+$ the total amount of blades, and $\psi_b \subset R$ the azimuth angle for blade $b \subset Z^+$, where $\psi=0°$ indicates the vertical upright position. The collective mode $M_0$ represents the cumulative out-of-plane rotor moment, and $M_t$ and $M_y$ represent the fixed frame and azimuth-independent tilt- and yaw-moments respectively. The latter two mentioned components are typically used for the purpose of fatigue load reductions.

In this case however, a time-varying yaw function that is indicative for a torsional yaw moment along the rotational yaw direction and a time-varying tilt function that is indicative for a torsional tilt moment along the rotational tilt direction are defined. The time-varying tilt and yaw functions are sinusoidal signals having the predetermined frequency (as determined on the basis of the non-dimensional Strouhal number) and a phase different of 90 degrees with respect to each other.

By applying the reverse MBC transformation to the non-rotating signals, this yields implementable individual pitch contributions in the rotating (i.e. blade) frame.

$$\begin{bmatrix} \theta_{1,n}(t) \\ \theta_{2,n}(t) \\ \theta_{3,n}(t) \end{bmatrix} = T_n^{-1}(\psi + \psi_o) \begin{bmatrix} \theta_{0,n}(t) \\ \theta_{t,n}(t) \\ \theta_{y,n}(t) \end{bmatrix}, \text{with}$$

$$T_n^{-1} = \begin{bmatrix} 1 & \cos[n(\psi_1 + \psi_{o,n})] & \sin[n(\psi_1 + \psi_{o,n})] \\ 1 & \cos[n(\psi_2 + \psi_{o,n})] & \sin[n(\psi_2 + \psi_{o,n})] \\ 1 & \cos[n(\psi_3 + \psi_{o,n})] & \sin[n(\psi_3 + \psi_{o,n})] \end{bmatrix},$$

where $\theta_{0,n}$, $\theta_{t,n}$ and $\theta_{y,n}$ are respectively the fixed frame collective, tilt and yaw pitch signals, and $\psi_{o,n}$ is the azimuth offset for each harmonic.

FIG. 11 schematically shows, for the second example, the location of the wake with respect to (the center) of the rotor plate at different time instances during rotating of the rotor for a turbine controlled using the oscillatory individual blade pitch rotations. It thus shows where the turbine wake is released from the turbine. The spiral-shaped (i.e. helix-shaped) wake is formed, as the location at which the wake is formed also varies and oscillates around the rotor center while the air in the wake of the turbine moves downstream.

With the Helix Input, the motion of the platform is a superposition of pitch, roll and yaw motion. The resulting Bode plots from the experiments are shown in FIG. 12. As with the Pulse, the vertical dotted line indicates a Strouhal number of St=0.25 which leads to an increased wake mixing.

For the Helix, the dominant motion of the platform will be in the yaw direction. This is primarily be explained by the fact that the yaw motion of a platform is very lightly dampened in comparison to pitch and roll. For the platform roll and pitch motion the buoyancy forces add significant restoring forces which result in lower gains and higher damping ratios. For this particular platform/turbine combination, the excitation frequency of St=0.25 is close to its natural frequency.

Another aspect to take into account is the phase difference between the Helix input and the platform motion (PM). Close to St=0.25 there is a 180 degree phase loss. Depending on the exact Strouhal number and system conditions, the phase difference could vary between −180 and −360 degrees. This phase difference is further complicated by the fact that for the Helix, the pitch and yaw moment as defined in the MBC transformation also have a phase offset of −90 degrees with respect to one another. Depending on which moment is being analysed, a further −90 degree phase loss can be expected. The influence the phase difference has on the level of wake mixing is further explained below.

Since, for the Helix, the variation of the thrust force in x-direction (i.e. substantially parallel to the rotor axis) is small, it does not excite the pitching motion of the platform. The roll motion will also remain relatively small compared to the yaw motion of the platform. At the excitation frequency St=0.25, the translational motions of the platform are an order of magnitude lower than the rotational motions. The yaw motion, and its effect on the wake, is depicted schematically in FIG. 10. The arrow denotes the effective location of the thrust forces. Its movement with respect to the yawing motion is dependent on how the Helix is implemented (with phase lag or phase lead for the yaw moment).

Also, because the platform is being yawed, this also leads to wake deflection. Furthermore, the gain in terms of absolute multiplication at the peak is a factor of 3. This implies that with 2 degrees of oscillatory blade pitching for the Helix, the platform will be oscillatory yawing with 6 degrees. If this oscillatory yawing motion is aligned (i.e. in phase) with the yaw moment of the helix, this effect could be enhanced significantly.

For the Helix the following cases will be evaluated:
2.1 Individual blade pitch rotations as described above (i.e. the Helix Input) with an amplitude of 2 degrees and no platform motion.
2.2 Individual blade pitch rotations as described above (i.e. the Helix Input) with an amplitude of 2 degrees and 6 degree yaw platform motion at 0 degree phase delay.
2.3 Individual blade pitch rotations as described above (i.e. the Helix Input) with an amplitude of 2 degrees and 6 degree yaw platform motion at 90 degree phase delay.
2.4 Individual blade pitch rotations as described above (i.e. the Helix Input) with an amplitude of 2 degrees and 6 degree yaw platform motion at 180 degree phase delay.
2.5 Individual blade pitch rotations as described above (i.e. the Helix Input) with an amplitude of 2 degrees and 6 degree yaw platform motion at 270 degree phase delay.
2.6 Individual blade pitch rotations as described above (i.e. the Helix Input) with an amplitude of 4 degrees and no platform motion.

Cases 2.2 to 2.5 are serve to evaluate what effect a difference in phase delay has on the wake mixing performance. Cases 2.1 and 2.6 allow for a direct comparison between a floating and fixed-bottom turbine as well as evaluate the difference in wake mixing between different amplitudes. For the Helix, the motion of the platform is limited to yawing for similar reasons as with the Pulse-simulations.

FIGS. 13 and 14 show, for different test cases of the second example, the effect the oscillatory individual blade pitch rotations have on the wind speed in the wake downwind of the turbine, and the effect on the (aerodynamic) power output of the wind turbine.

FIG. 14 shows the power variation for the upwind turbine. The high frequency nature of the Helix is clearly present in the signal. Between all the floating cases, there is no significant difference in terms of power generation by the turbine, with only the 4 degree case producing overall less overall power. FIG. 13 shows the average wind speed that a potential second turbine that is located 5 rotor diameters (i.e. 5D) downstream would experience. Because the overall (i.e. total) variation of the induction factor of turbine is less with the Helix compared to the Pulse, the cyclic nature is less visible in the wind speed. The results are summarized in the table below, wherein it is seen that an improved wake mixing is obtained with respect to the baseline case. Specifically for the cases with the 6° yaw rotational platform motion (YPM) having 0 degree, 90 degree and 270 degree phase delay, an increase in wake mixing is observed with respect to the case that has no platform motion (No PM).

|  | Baseline | 2° Helix; No PM | 2° Helix; YPM 0° | 2° Helix; YPM −90° | 2° Helix; YPM −180° | 2° Helix; YPM −270° | 4° Helix; No PM |
|---|---|---|---|---|---|---|---|
| Average Windspeed [m/s] at 5D | 5.69 | 6.92 (+21.68%) | 7.01 (+23.34%) | 7.04 (+23.73%) | 6.80 (+19.56%) | 7.05 (+23.96%) | 7.42 (+30.45%) |
| Average Power [kW] | 2916 | 2844 (−2.49%) | 2836 (−2.80%) | 2845 (−2.46%) | 2833 (−2.88%) | 2826 (−3.11%) | 2730 (−6.4%) |

As is shown in the above described examples, the combination of the oscillating blade pitch rotations and the oscillating movement of the movable foundation, and thereby the oscillating movement of the rotor axis along the respective directions, enables an increased wake mixing in the wake formed downstream of the turbine. Also, it is demonstrated that this increased wake mixing costs only a fraction of the (aerodynamic) power output of the (upstream) turbine, such that an overall increase in the generated wind power in a wind farm can be obtained.

Finally, FIG. 15 shows the effect of the control strategy of the first and second examples on the amplitude and orientation of thrust force that is experienced by the wind turbine. When applying wake mixing strategies to a turbine, the induction of the blades is continuously varied. This in effect causes the thrust forces to change in either x,y or z direction, i.e. surge, sway, heave (or a combination of those). For a fixed-bottom turbine, this fluctuation in force results in an increase in variation of the tower bending moments. For a floating platform, however, this also leads to the respective motions of the platform, as has been described above. This variation in thrust force is shown in FIG. 15.

The present disclosure is not limited to the embodiment shown, but extends also to other embodiments falling within the scope of the appended claims. It is noted that, although the examples use a floating wind turbine, the disclosure is not limited to a floating turbine, as the approach would also work for a turbine having a movable rotor axis in general. For instance, the rotor could be mounted to the nacelle by means of a teetering hinge, the nacelle could be movably mounted to the tower top, or (in general) a movable foundation structure could be provided. Furthermore, the disclosure is also not limited to horizontal-axis wind turbines (HAWT's) wherein the main rotor shaft extends in a generally horizontal plane. For instance, the wind turbine could also be a vertical-axis wind turbine (VAWT) (also known as transverse axis wind turbine or a cross-flow wind turbine) wherein the main rotor shaft is set transverse to the wind direction, for instance in a vertical of nearly vertical direction, while the main components are located at the base of the support structure of the turbine.

The invention claimed is:

1. A wind turbine comprising:
a rotor comprising at least a first blade, said first blade is configured to rotate in a rotor plane along an azimuth rotational direction around a rotor axis of the rotor, said first blade being rotatable by a blade pitch driving mechanism around a blade pitch axis that is substantially parallel to a longitudinal axis of the first blade, said rotor axis being movable in at least one of a rotational tilt direction and a fore-aft translational direction;
a supporting structure configured to support said rotor up in the air; and
a controller configured to control the wind turbine, the controller being configured to vary an induction factor of the first blade over time while the rotor rotates around the rotor axis, the controller being configured to vary said induction factor of the first blade by:
controlling the blade pitch driving mechanism to apply at least one oscillatory blade pitch rotation to at least the first blade, and
inducing an oscillatory motion of the rotor axis in the at least one of the rotational tilt direction and the fore-aft translational direction,
said controller being configured to control the blade pitch driving mechanism to apply the oscillatory blade pitch rotation of the first blade at a predetermined frequency and to induce the oscillatory motion of the rotor axis oscillate with substantially the same frequency as the predetermined frequency.

2. The wind turbine as claimed in claim 1, wherein one of: (i) the rotor is configured to extend essentially perpendicular to an imaginary longitudinal axis with respect to a foundation structure, and (ii) the wind turbine is a horizontal-axis wind turbine (HAWT).

3. The wind turbine as claimed in claim 1, wherein said rotor axis is movable in at least one of the rotational tilt direction, a rotational yaw direction, and the fore-aft translational direction, said rotational tilt direction being a rotational direction around a tilt axis that is substantially horizontal and substantially parallel to the rotor plane, said rotational yaw direction being a rotational direction around a yaw axis that is substantially vertical and substantially perpendicular to the tilt axis, and said fore-aft translational direction being a direction substantially parallel to the rotor axis, and
wherein the controller is configured to vary the induction factor of at least the first blade by controlling the blade pitch driving mechanism to apply an oscillatory blade pitch rotation to at least the first blade, thereby inducing an oscillatory motion of the rotor axis in the at least one of the rotational tilt direction and the fore-aft translational direction.

4. The wind turbine according to claim 1, wherein said controller is configured to induce said oscillatory motion of the rotor axis in the at least one of the rotational tilt direction, the rotational yaw direction, and the fore-aft translational direction by controlling the blade pitch driving mechanism to apply the oscillatory blade pitch rotation of a least the first blade while the rotor rotates around the rotor axis.

5. The wind turbine according to claim 1, wherein one of: (i) the rotor is configured to extend essentially parallel to an imaginary longitudinal axis with respect to a foundation structure, and (ii) the wind turbine is a vertical-axis wind turbine (VAWT).

6. The wind turbine as claimed in claim 1, wherein said fore-aft translational direction is a direction substantially parallel to wind direction, the rotational tilt direction being a rotational direction around a tilt axis that is substantially horizontal and substantially perpendicular to the fore-aft translational direction.

7. The wind turbine according to claim 1, wherein the controller is configured to vary the induction factor of the first blade over time such that the induction factor of the first blade varies with the rotation of the first blade along the azimuth rotational direction.

8. The wind turbine according to claim 1, wherein the supporting structure is a floating support structure.

9. The wind turbine according to claim 1, wherein the supporting structure comprises a base and a movable foundation structure.

10. The wind turbine according to claim 1, wherein said wind turbine is a floating wind turbine,
wherein said supporting structure comprises a floating movable foundation structure having a buoyant body and at least one mooring line configured to couple the buoyant body to an earth-fixed connection point.

11. The wind turbine according to claim 1, wherein said controller is configured to control the blade pitch driving mechanism to apply the oscillatory blade pitch rotation such that the blade pitch rotation varies between a minimum and maximum value around a mean blade pitch rotation.

12. The wind turbine according to claim 1, wherein said controller is configured to control the blade pitch driving mechanism for the oscillatory blade pitch rotation to be a substantially sinusoidal oscillatory blade pitch rotation having a predetermined amplitude.

13. The wind turbine according to claim 1, wherein the rotor comprises at least a second blade that is rotatable by the blade pitch driving mechanism around a blade pitch axis that is substantially parallel to a longitudinal axis of the blade.

14. The wind turbine according to claim 13, wherein the controller is configured to induce at least one of the oscillatory rotational tilt motion and fore-aft translation motion of the rotor axis by controlling the blade pitch driving mechanism to apply a collective oscillatory blade pitch rotation to the first and second blade while the rotor rotates around the rotor axis.

15. The wind turbine according to claim 13, wherein the blade pitch driving mechanism is an individual blade pitch driving mechanism configured to independently drive the pitch rotations of the respective first and second blade,
wherein the controller is configured to induce the at least one of the rotational tilt direction, a rotational yaw direction, and the fore-aft translational direction of the rotor axis by controlling the individual blade pitch driving mechanism to apply individual oscillatory blade pitch rotations to the first and second blade while the rotor rotates around the rotor axis, wherein the pitch rotation of the first blade differs from the pitch rotation of the second blade by a predetermined phase offset.

16. The wind turbine according to claim 1, wherein the controller is configured to determine the at least one oscillatory blade pitch rotation that is to be applied by performing a reverse multiblade coordination (MBC) transformation on a time-varying yaw function that is defined in a non-rotating reference frame, or on a time-varying tilt function that is defined in a non-rotating reference frame, or on a combination of the time-varying yaw and tilt functions, wherein said time-varying yaw function is indicative of a torsional yaw moment along a rotational yaw direction that induces the oscillatory motion of the rotor axis in the rotational yaw direction, and wherein said time-varying tilt function is indicative of a torsional tilt moment along the rotational tilt direction that induces the oscillatory motion of the rotor axis in the rotational tilt direction.

17. The wind turbine according to claim 1, wherein the controller is configured to determine the predetermined frequency based on a diameter of the rotor, a rotational speed of the rotor, an inflow wind speed that is determined upstream of the wind turbine, and the Strouhal number, the Strouhal number being between 0.05 and 1.0.

18. The wind turbine according to claim 1, wherein a relationship between an amplitude of an applied oscillatory blade pitch rotation and an amplitude of tan induced oscillatory motion of the rotor axis in the rotational tilt direction defines a blade pitch-tilt amplification factor, the blade pitch-tilt amplification factor being at least a factor of 0.1; and/or wherein a relationship between an amplitude of the applied oscillatory blade pitch rotation and an amplitude of the induced oscillatory motion of the rotor axis in a rotational yaw direction defines a blade pitch-yaw amplification factor, the blade pitch-yaw amplification factor being at least a factor of 0.5.

19. The wind turbine according to claim 1, wherein the induction factor of the first blade is dependent on the wind speed upstream of the first blade and the wind speed at the first blade, wherein the induction factor is the ratio between:
the difference of the wind speed upstream of the first blade and the wind speed at the first blade, and
the wind speed upstream of the first blade.

20. The wind turbine as claimed in claim 1, further comprising a motion sensor configured to generate a motion signal representative of the motion of the supporting structure, the motion sensor being connected to the controller, the controller being configured to vary the induction factor of the blade based on the received motion signal.

* * * * *